(12) United States Patent
Detering et al.

(10) Patent No.: US 7,097,675 B2
(45) Date of Patent: Aug. 29, 2006

(54) FAST-QUENCH REACTOR FOR HYDROGEN AND ELEMENTAL CARBON PRODUCTION FROM NATURAL GAS AND OTHER HYDROCARBONS

(75) Inventors: Brent A. Detering, Idaho Falls, ID (US); Peter C. Kong, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 493 days.

(21) Appl. No.: 10/109,427

(22) Filed: Mar. 27, 2002

(65) Prior Publication Data

US 2002/0151604 A1    Oct. 17, 2002

Related U.S. Application Data

(62) Division of application No. 09/732,451, filed on Dec. 6, 2000, now Pat. No. 6,395,197.

(60) Provisional application No. 60/172,976, filed on Dec. 21, 1999.

(51) Int. Cl.
  *H05H 1/02*  (2006.01)
  *H05H 1/00*  (2006.01)
  *B01J 19/08* (2006.01)

(52) U.S. Cl. .................. 48/127.9; 48/197; 422/186; 422/186.22

(58) Field of Classification Search .............. 48/61, 48/62 R, 77, 89, 101, 102 R, 119, 127.9, 48/210, 197 R, 211, 198.1, 198.3, 197 FM; 422/150–152, 188, 193, 194, 198
See application file for complete search history.

(56) References Cited

U.S. PATENT DOCUMENTS

| 2,475,282 A | 7/1949 | Hasche |
| 2,552,308 A | 5/1951 | Buchmann et al. |
| 2,686,195 A | 8/1954 | McAdams et al. |
| 3,051,639 A | 8/1962 | Anderson |
| 3,123,464 A | 3/1964 | Casey et al. |
| 3,211,548 A | 10/1965 | Scheller et al. |

(Continued)

FOREIGN PATENT DOCUMENTS

DE    1142159    7/1960

(Continued)

OTHER PUBLICATIONS

Olsen et al., "Unit Processes and Principles of Chemical Engineering", D. Van Nostrand Co., Inc., Jul. 5, 1932, pp. 1-3.*

(Continued)

*Primary Examiner*—Alexa D. Neckel
(74) *Attorney, Agent, or Firm*—TraskBritt, P.C.

(57) ABSTRACT

A fast-quench reactor for production of diatomic hydrogen and unsaturated carbons is provided. During the fast quench in the downstream diverging section of the nozzle, such as in a free expansion chamber, the unsaturated hydrocarbons are further decomposed by reheating the reactor gases. More diatomic hydrogen is produced, along with elemental carbon. Other gas may be added at different stages in the process to form a desired end product and prevent back reactions. The product is a substantially clean-burning hydrogen fuel that leaves no greenhouse gas emissions, and elemental carbon that may be used in powder form as a commodity for several processes.

19 Claims, 12 Drawing Sheets

U.S. PATENT DOCUMENTS

| | | |
|---|---|---|
| 3,408,164 A | 10/1968 | Johnson |
| 3,429,691 A | 2/1969 | Mclaughlin |
| 3,630,718 A | 12/1971 | Neuenschwander |
| 3,668,108 A | 6/1972 | Houseman |
| 3,682,142 A | 8/1972 | Newkirk |
| 3,738,824 A | 6/1973 | Davis et al. |
| 3,840,750 A | 10/1974 | Davis et al. |
| 3,848,068 A | 11/1974 | Rice |
| 3,891,562 A | 6/1975 | Morgensen et al. |
| 3,899,573 A | 8/1975 | Shaw et al. |
| 3,914,573 A | 10/1975 | Muehlberger |
| 3,954,954 A | 5/1976 | Davis et al. |
| 3,976,442 A | 8/1976 | Paull et al. |
| 3,989,512 A | 11/1976 | Sayce |
| 3,992,193 A | 11/1976 | Fey et al. |
| 4,022,872 A | 5/1977 | Carson et al. |
| 4,080,194 A | 3/1978 | Fey |
| 4,107,445 A | 8/1978 | Wolf et al. |
| 4,145,403 A | 3/1979 | Fey et al. |
| 4,146,389 A | 3/1979 | Karlovitz |
| 4,164,553 A | 8/1979 | Perugini et al. |
| 4,182,746 A | 1/1980 | Myint |
| 4,309,359 A | 1/1982 | Pinto |
| 4,315,893 A * | 2/1982 | McCallister ................ 422/109 |
| 4,335,080 A | 6/1982 | Davis et al. |
| 4,347,060 A | 8/1982 | Blizzard et al. |
| 4,356,029 A | 10/1982 | Down et al. |
| 4,410,358 A | 10/1983 | Heshmatpour |
| 4,561,883 A | 12/1985 | Miillner et al. |
| 4,610,718 A | 9/1986 | Araya et al. |
| 4,612,045 A | 9/1986 | Shintaku |
| 4,670,359 A | 6/1987 | Beshty et al. |
| 4,731,111 A | 3/1988 | Kopatz et al. |
| 4,762,756 A | 8/1988 | Bergmann et al. |
| 4,772,315 A | 9/1988 | Johnson et al. |
| 4,783,216 A | 11/1988 | Kemp, Jr. et al. |
| 4,801,435 A | 1/1989 | Tylko |
| 4,833,170 A | 5/1989 | Agee |
| 4,851,262 A | 7/1989 | McFeaters |
| 4,875,810 A | 10/1989 | Chiba et al. |
| 4,891,066 A | 1/1990 | Shimotori et al. |
| 4,909,914 A | 3/1990 | Chiba et al. |
| 4,911,805 A | 3/1990 | Ando et al. |
| 5,017,196 A | 5/1991 | Dewitz |
| 5,017,754 A | 5/1991 | Drouet et al. |
| 5,028,417 A | 7/1991 | Bhat et al. |
| 5,062,936 A | 11/1991 | Beaty et al. |
| 5,073,193 A | 12/1991 | Chaklader et al. |
| 5,110,565 A | 5/1992 | Weimer et al. |
| 5,194,128 A | 3/1993 | Beaty et al. |
| 5,215,749 A | 6/1993 | Nicoll et al. |
| 5,257,500 A | 11/1993 | Venkataramani et al. |
| 5,294,242 A | 3/1994 | Zurecki et al. |
| 5,409,784 A | 4/1995 | Bromberg et al. ............. 429/13 |
| 5,425,332 A | 6/1995 | Rabinovich et al. ........... 123/3 |
| 5,437,250 A | 8/1995 | Rabinovich et al. ........... 123/3 |
| 5,481,080 A | 1/1996 | Lynum et al. ......... 219/121.48 |
| 5,486,313 A | 1/1996 | De Jong et al. |
| 5,500,501 A | 3/1996 | Lynum et al. ......... 219/212.48 |
| 5,527,518 A | 6/1996 | Lynum et al. ........... 423/449.1 |
| 5,538,706 A | 7/1996 | Kapoor et al. |
| 5,582,927 A | 12/1996 | Andricacos et al. |
| 5,723,505 A | 3/1998 | Chaumette et al. |
| 5,725,616 A | 3/1998 | Lynum et al. ............. 48/127.3 |
| 5,733,941 A | 3/1998 | Waycuilis |
| 5,749,937 A | 5/1998 | Detering et al. ........... 75/10.19 |
| 5,788,738 A | 8/1998 | Pirzada et al. |
| 5,851,507 A | 12/1998 | Pirzada et al. |
| 5,852,927 A | 12/1998 | Cohn et al. ................. 60/39.05 |
| 5,861,441 A | 1/1999 | Waycuilis |
| 5,883,138 A | 3/1999 | Hershkowitz et al. |
| 5,886,056 A | 3/1999 | Hershkowitz et al. |
| 5,887,554 A | 3/1999 | Cohn et al. .................... 123/3 |
| 5,935,293 A | 8/1999 | Detering et al. |
| 5,984,997 A | 11/1999 | Bickmore et al. |
| 6,187,226 B1 * | 2/2001 | Detering et al. ............. 252/373 |
| 6,379,419 B1 | 4/2002 | Celik et al. |
| 6,395,197 B1 | 5/2002 | Detering et al. |
| RE37,853 E * | 9/2002 | Detering et al. ........... 75/10.19 |
| 6,821,500 B1* | 11/2004 | Fincke et al. ................ 423/650 |
| 2004/0208805 A1* | 10/2004 | Fincke et al. .......... 422/186.04 |

FOREIGN PATENT DOCUMENTS

| | | |
|---|---|---|
| DE | 1 142 159 | 1/1963 |
| DE | 269 157 A1 | 6/1989 |
| DE | 293 704 | 9/1991 |
| EP | 0 282 291 B1 | 6/1992 |
| EP | 0 618 951 B1 | 9/1996 |
| FR | 2 341 389 | 9/1977 |
| FR | 2 603 209 | 3/1988 |
| GB | 1 248 595 | 10/1971 |
| GB | 2 217 699 A | 11/1989 |
| GB | 2 279 009 A | 12/1994 |
| JP | 30-7408 | 10/1955 |
| JP | 38-6854 | 5/1963 |
| SU | 322960 | 1/1975 |
| SU | 223055 | 6/1982 |
| WO | WO 9312205 | 6/1993 |
| WO | WO 96/28577 | 9/1996 |
| WO | WO 98/19965 | 5/1998 |
| WO | WO 01/58625 A1 | 8/2001 |
| WO | WO 01/78471 A1 | 10/2001 |

OTHER PUBLICATIONS

McFeaters, J., et al., Application of Nonequilibrium Gas-Dynamic Techniques to the Plasma Synthesis of Ceramic Powders, VCH Publications, 1990, Chapter 46, pp. 431-446.

Down, M.G., *Titanium Production by a Plasma Process*, Final Technical Report, Materials Laboratory, Air Force Wright Aeronautical Laboratories (IAD A 121892), May 1982, pp. 1-8.

"The INEL Plasma Research Program," Idaho National Engineering Laboratory (BP422E-R0592-1M-T), May 1992.

European Search Report dated Apr. 9, 2003, of EP 02257291.

* cited by examiner

FAST-QUENCH REACTOR FOR HYDROGEN AND ELEMENTAL CARBON PRODUCTION FROM NATURAL GAS AND OTHER HYDROCARBONS

RELATED APPLICATION

This application is a divisional of application Ser. No. 09/732,451, filed Dec. 6, 2000, now U.S. Pat. No. 6,395,197, issued May 28, 2002, which claims priority from U.S. provisional application Ser. No. 60/172,976, filed Dec. 21, 1999.

CONTRACTUAL ORIGIN OF THE INVENTION

This invention was made with United States Government support under Contract No. DE-AC07-94ID13223, now Contract No. DE-AC07-991D13727 awarded by the United States Department of Energy. The United States Government has certain rights in the invention.

TECHNICAL FIELD

The present invention relates to equipment and methods for thermal conversion of light hydrocarbons such as natural gas and other reactants to desired end products, particularly diatomic hydrogen and elemental carbon. The end products may be either a gas or ultrafine solid particles. The present invention also relates specifically to methods for effectively producing such end products.

BACKGROUND OF THE INVENTION

Methane and other light hydrocarbon combustibles are often found in remote areas. Worldwide natural gas reserves have increased on an average of about six percent annually, while natural gas consumption has only increased about three percent annually.

The difference between known and used reserves has increased, therefore, to about 4.6 quadrillion cubic feet. Known natural gas reserves, therefore, have an energy equivalent of some 770 billion barrels of oil that is equivalent to about a 29 year worldwide supply of oil for energy purposes. Unfortunately, however, most of the natural gas reserves are located in remote areas. Remote natural gas reserves usually make the economics of extraction and removal unfeasible.

The Fischer-Tropsch process, developed early in the 20th century in Germany, uses fossil fuels and converts the fossil fuels to liquid synthetic gasoline species. The Fischer-Tropsch synthesis is strongly exothermic and often requires hydrogen in the process. Where a Fischer-Tropsch process is being conducted at remote sites without a proper infrastructure for readily available hydrogen, the cost of production is significantly increased by the need to bring the hydrogen to the remote site.

As environmental concerns increase regarding greenhouse gases that may contribute to global warming, increased interest is directed toward finding clean burning fuels that do not produce carbon dioxide emissions. Hydrogen as a fuel seems to be ideal as it burns to form only water as its combustion product.

A need has long existed for converting available carbonaceous materials to scarce liquid hydrocarbon fuels having preferred performance characteristics in many applications, such as internal combustion engines, jet engines and open-cycle gas turbines. Thus, for example, U.S. Pat. No. 3,986,349 teaches a process for converting solid coal to a liquid hydrocarbon fuel by gasifying the coal to a synthesis gas, hydrogenating the resulting synthesis gas, and recovering a liquid hydrocarbon fuel from the hydrogenation product. The liquid hydrocarbon fuel is used to generate power by relatively clean combustion in an open-cycle gas turbine.

An alternative is to produce natural gas and convert it in the field to a more utilitarian liquid hydrocarbon fuel or liquid chemical product for local usage or for more cost-effective transportation to remote markets. Processes for converting light hydrocarbon gases, such as natural gas, to heavier hydrocarbon liquids are generally known in the prior art. Such processes typically involve the indirect conversion of methane to synthetic paraffinic hydrocarbon compounds, wherein methane is first converted to a synthesis gas containing hydrogen and carbon monoxide followed by conversion of the synthesis gas to synthetic paraffinic hydrocarbon compounds via a Fischer-Tropsch reaction. The unconverted synthesis gas remaining after the Fischer-Tropsch reaction is usually catalytically reconverted to methane via a methanation reaction and recycled to the process inlet to increase the overall conversion efficiency of the process.

Conversion of methane to a synthesis gas is often performed by high-temperature steam reforming, wherein methane and steam are reacted endothermically over a catalyst contained within a plurality of externally-heated tubes mounted in a large fired furnace. Alternatively, methane is converted to a synthesis gas via partial-oxidation, wherein the methane is exothermically reacted with purified oxygen. Partial oxidation using purified oxygen requires an oxygen separation plant having substantial compression capacity and correspondingly having substantial power requirements. Production of the synthesis gas via either of the above-recited methods accounts for a major portion of the total capital cost of a plant for converting methane to paraffinic hydrocarbons.

Autothermal reforming is a lower cost method of converting methane to a synthesis gas. Autothermal reforming employs a combination of partial oxidation and steam reforming. The endothermic heat required for the steam reforming reaction is obtained from the exothermic partial oxidation reaction. Unlike the above-recited partial oxidation reaction, however, air is used as the source of oxygen for the partial oxidation reaction. In addition, the synthesis gas produced by autothermal reforming contains substantial quantities of nitrogen from the inlet air. Consequently, it is not possible to recycle the unconverted components contained in the process tail gas without undesirably accumulating an excess of nitrogen within the process. Production of a nitrogen-diluted synthesis gas via autothermal reforming or partial-oxidation using air followed by conversion of the synthesis gas via a Fischer-Tropsch reaction as disclosed in U.S. Pat. Nos. 2,552,308 and 2,686,195 is, nevertheless, a useful method for obtaining synthetic hydrocarbon liquid products from methane.

U.S. Pat. No. 4,833,170 discloses another example of autothermal reforming, wherein a gaseous light hydrocarbon is reacted with air in the presence of recycled carbon dioxide and steam to produce a synthesis gas. The synthesis gas is reacted in the presence of a hydrocarbon synthesis catalyst containing cobalt to form a residue gas stream and a liquid stream comprising heavier hydrocarbons and water. The heavier hydrocarbons are separated from the water and recovered as product. The residue gas is catalytically combusted with additional air to form carbon dioxide and nitrogen which are separated. At least a portion of the carbon dioxide is recycled to the autothermal reforming step.

Although prior art hydrocarbon gas conversion processes such as disclosed in U.S. Pat. No. 4,833,170 may be relatively effective for converting the light hydrocarbon gases to heavier hydrocarbon liquids, such processes have not been found to be entirely cost effective due to significant capital equipment and energy costs attributable to compression of the inlet air. The power required to compress the inlet air represents the majority of the mechanical power required to operate the process, yet much of this power is essentially lost as unrecovered pressure energy in the residue gas from the process. The inlet air requiring compression contains substantial quantities of nitrogen that remain essentially chemically inert as the nitrogen passes through the process, ultimately exiting the process in the residue gas. Furthermore, although the residue gas has a significant chemical-energy fuel value attributable to the carbon monoxide, hydrogen, methane and heavier hydrocarbon components thereof, the residue gas is very dilute, having a low heating value that renders it very difficult and costly to recover the energy of the fuel value of the residue gas with high efficiency. Thus, it is apparent that a need exists for a more cost-effective hydrocarbon gas conversion process.

In the above-mentioned technologies, it is well known that a carbon-containing chemical species will be combusted and the amount of greenhouse gases that are emitted to the atmosphere, namely carbon dioxide, is increased. What is needed in the art is a process for making synthetic fuels from light hydrocarbons that eliminates the emission of greenhouse gases.

Another problem that occurs is the need for cryogenic storage of converted fuels such as hydrogen. Hydrogen storage presents a problem because an on-board system of a hydrogen heat engine for a vehicle has a range of approximately 50 miles with hydrogen stored in pressurized tanks. Typically, a combination of both cryogenic and high-pressure hydrogen storage are required in order to contain the hydrogen in a compact enough package to carry as an on-board system.

Several attempts have been made to store hydrogen as a metal hydride in order to lessen the need for both cryogenic and high-pressure storage. Metal hydride storage has its own challenges including added weight of the metal and added energy required to separate the hydrogen as the hydride of the metal in order to provide it as the fuel source. What is needed in the art is a process of making synthetic fuels from light hydrocarbons that eliminates the problems of hydrogen storage experienced in the prior art.

Another problem that exists in the prior art is the creation of $H_2$ and soot by use of a plasmatron. Although $H_2$ and soot may be created, such as taught by Bromberg et al. in U.S. Pat. No. 5,409,784, non-ultrafine soot particle sizes are irregular and tend to form agglomerations that are of a size above the 2,000 nm range. Although plasmatrons may produce $H_2$ and soot, the extremely chaotic nature of the production of $H_2$ and soot likely cause the irregular soot particle sizes.

SUMMARY OF THE INVENTION

The present invention relates to the formation of diatomic hydrogen and elemental carbon from feed stocks of light hydrocarbons such as natural gas and/or methane.

The inventive process operates by injecting light hydrocarbons such as natural gas and other optional reactants into the inlet end of a reaction chamber and rapidly heating the reactants to produce a hot hydrogen and acetylene product stream which flows toward the outlet end of the reaction chamber. The reaction chamber may have a predetermined length that is sufficient to effect heating of the reactant stream to a selected equilibrium temperature and a preferred equilibrium composition of primarily diatomic hydrogen and unsaturated hydrocarbons such as acetylene.

Upon reaching the selected equilibrium temperature, the desired end product is available to be formed from the product stream as a thermodynamically stable or unstable reaction product at a location adjacent to the outlet end of the reactor chamber. The product stream may be passed through a restrictive convergent-divergent nozzle arranged coaxially within the remaining end of the reactor chamber to rapidly cool the gaseous stream by converting kinetic energy to thermal energy as a result of substantially adiabatic and isentropic expansion as it flows axially through the nozzle to minimize back reactions. A gradual expansion is not sought after as further decomposition of the unsaturated hydrocarbon is desired. The product stream thereby reheats to decompose the acetylene into hydrogen and elemental carbon. Thereby, the desired end product within the flowing gaseous stream is retained. Subsequently, the product stream is cooled and slowed down in velocity. Solid material, namely the elemental carbon, is recovered in any suitable device such as a cyclone.

In one embodiment, the rapid heating step is accomplished by introducing a stream of plasma arc gas to a plasma torch at the inlet end of the reaction chamber to produce a plasma within the reaction chamber which extends toward its outlet end.

Another method of this invention uses a virtual convergent-divergent nozzle. This is accomplished by directing one or more streams of particles, droplets, liquid, or gas into the main flow stream of the reactor chamber such that the main reactant flow stream is forced to flow as though a real convergent-divergent nozzle were present. This phenomena occurs because the reduced axial momentum of the directing flow effectively impedes the flow of the main stream, thereby forcing the majority of the main stream to flow around the impeding stream, similar to the flow through the restriction of a conventional converging-diverging nozzle. A similar cooling effect is achieved with the virtual nozzle. Although in some embodiments a rapid expansion is preferred in order to form elemental carbon and diatomic hydrogen by thermal decomposition, the directing or impeding stream(s) can play other roles beyond merely providing the virtual nozzle effect. In addition to keeping the main flow stream away from the wall, they can interact with the main stream further downstream in various ways to provide, for example, enhanced heat transfer, mixing, chemical reaction, etc. The virtual nozzle effect can also be utilized in combination with a conventional, gradual expansion converging-diverging nozzle to achieve optimal performance of a rapid expansion. To obtain the desired expansion and to cool the desired end products of elemental carbon and diatomic hydrogen, it is preferable to adjust the velocity and the quantity of the reactants, the number and position of the supply inlets, and the diameter of the reactor chamber.

The present invention converts a predominantly natural gas or other light hydrocarbon stream to diatomic hydrogen and elemental carbon with minor amounts of impurities. With either the inventive convergent-divergent nozzle or the virtual convergent-divergent nozzle, the present invention is particularly well suited for the production of ultrafine solid particles comprising elemental carbon. The rapid conversion of intermediate products to end products allows for the formation of the ultrafine carbon particles. Ultrafine carbon particles formed by the present invention are in a size range from about 10 nm to about 100 nm. Where the ultrafine solid particles are in the preferred size range, the present invention is particularly well suited for the storage of the diatomic hydrogen upon the ultrafine elemental carbon.

Some benefits of the present invention include energy efficiency and economically versatile scalability to a variety of production rates, from as low as a few thousand cubic feet per hour or lower to millions of cubic feet per hour or higher. The present invention also has the benefit of sequestering a significant fraction of carbon from the raw feed stock and diverting it from discharge to the environment as a greenhouse gas. The present invention is also useful for the production of hydrogen and carbon in remote areas that only require a suitable site and an available source of natural gas such as methane. Further, any electricity needed for the inventive process may be derived from the natural gas itself.

The present invention also uses hydrogen as a plasma gas in lieu of argon or as a major component compared to argon. Thereby, argon supply and argon separation from the product gases is not required or significantly reduced in importance.

The present invention also relates to an on-board plasma quench reformer system for hydrocarbon fuel, such as a natural gas fuel. In the on-board plasma quench reformer, either liquid natural gas or compressed natural gas is vaporized and converted into hydrogen and a selection of carbon compounds including carbon dioxide, carbon monoxide, and elemental carbon. The hydrogen is then supplied to the internal combustion engine as a reformed fuel source. The carbon is not combusted and greenhouse gases are not produced.

Therefore, in accordance with one aspect of the present invention, a method is provided of converting one or more hydrocarbon reactants in a gaseous stream to an end product that has the form of a gas or ultrafine solid particle by heating the reactant stream in an axial reactor to a preferred dissociation equilibrium of elemental carbon and diatomic hydrogen. In one embodiment of the present invention, the formation of diatomic hydrogen elemental carbon may be accomplished by quenching the heated reactant stream and rapidly reheating it in order to decompose any unsaturated hydrocarbons. Additionally, the present invention provides for decomposition of unsaturated hydrocarbons through a free expansion or through a rapid expansion of the equilibrium gas.

In one embodiment of the present invention, a system is provided for converting a hydrocarbon stream to diatomic hydrogen and elemental carbon.

The present invention further provides for expansion of reactant gases by the injection of other gases into an expansion zone to accomplish a virtual free expansion or a virtual rapid nozzle expansion. Additionally, the present invention may provide a waste heat economizer to preheat the reactant gases for the purpose of increased thermodynamic efficiency. In another embodiment of the present invention, separation of unsaturated hydrocarbons from the end product stream may be accomplished by gas absorption and other separations, such as acetylene separation from acetone. In another embodiment of the present invention, a hydrogen fuel cell system is provided that receives the diatomic hydrogen that has been converted from the light hydrocarbon feed stream. Another embodiment of the present invention provides an on-board system that uses a hydrocarbon fuel such as liquid natural gas or compressed natural gas to convert the light hydrocarbon into elemental carbon and diatomic hydrogen and to supply the diatomic hydrogen to a fuel cell or an internal combustion engine, whereby the elemental carbon is not discharged to the environment as a greenhouse gas.

In accordance with another aspect of the present invention, a hydrogen storage system is provided that combines the hydrogen and ultrafine carbon solids produced by the inventive method.

Various advantages and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not, therefore, to be considered to be limiting of its scope, the invention will be described and explained with additional specificity and detail through the use of the accompanying drawings in which.

DETAILED DESCRIPTION OF THE INVENTION

The present reactor and method are directed toward high-temperature reactions that decompose light hydrocarbons such as methane into thermodynamically stable compounds of diatomic hydrogen and unsaturated hydrocarbons such as acetylene, with minor impurities. Further, the present invention accomplishes decomposition of the unsaturated hydrocarbons to form additional diatomic hydrogen and elemental carbon. Thereby, a liquefiable, predominantly diatomic hydrogen fuel is prepared that is substantially devoid of any greenhouse gas precursor chemical species.

The inventive process requires rapid cooling to freeze the diatomic hydrogen and unsaturated hydrocarbon reaction products to prevent back reactions or decompositions to undesirable products. The process uses substantially constant enthalpy expansion of gases in a device such as a converging-diverging nozzle or an expansion chamber for rapid quenching. The expansion may result in cooling rates exceeding $10^{10}$ K/s, thus preserving reaction products that are in equilibrium only at high temperatures. The process also uses a free expansion of the gases after a manner that allows for the reaction products of unsaturated hydrocarbons to further decompose to form additional diatomic hydrogen and elemental carbon. The process also may use the injection of gases into the expanding gas to act as a virtual diverging nozzle or as a virtual free expansion.

The fast quench reactor and method of operation described in this disclosure take advantage of the temperatures in the range from about 500 to about 20,000° C. available in a high-temperature heating means, such as a thermal plasma to produce materials that are thermodynamically stable at these high temperatures. These materials include light hydrocarbons such as methane.

A converging-diverging (DeLaval) nozzle located downstream from the plasma and reactant addition inlet(s) produces a rapid drop in kinetic temperature in a flowing gas stream. This effectively freezes or stops all chemical reactions. Rapid expansion also permits efficient collection of desired reaction products as the gases are rapidly cooled without achieving an equilibrium condition. Resulting end reaction products which have been produced in the plasma at high temperature but are thermodynamically unstable or unavailable at lower temperatures are further decomposed into additional diatomic hydrogen and elemental carbon due to the rapid expansion. The end products may then be collected due to resulting phase changes (gas to solid) or stabilization by cooling to a lower equilibrium state. The fast quench reactor and method of this invention shall be described and illustrated forthwith in terms of a rapid heating means comprising a plasma torch and a stream of plasma arc gas. However, it will be recognized that the rapid heating means can also include other rapid heating means, such as lasers, and flames produced by oxidation of a suitable fuel, e.g., an oxygen/hydrogen flame.

Figure 1:
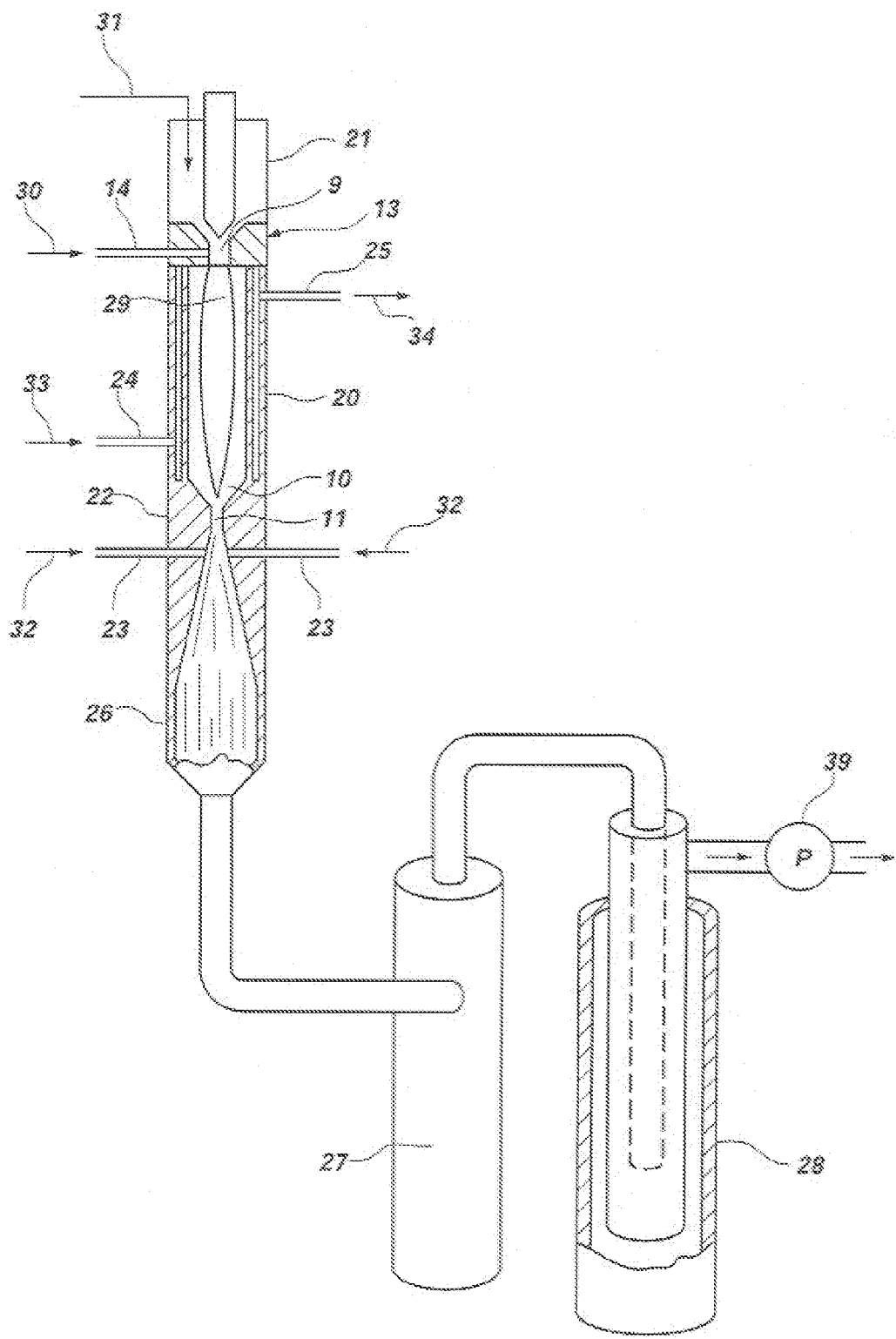
FIG. 1 is a schematic and cross-sectional view of a reactor system.

A schematic diagram of a quenching apparatus is shown in FIG. 1. An enclosed axial reactor chamber 20 includes an inlet 9 at one end and an outlet at its remaining end or nozzle 22.

A plasma torch 21 is positioned adjacent to the reactor chamber 20. Torch 21 is used to thermally decompose an incoming gaseous stream within a resulting plasma 29 as the gaseous stream is delivered through the inlet of the reactor chamber 20.

A plasma can be a luminous gas which is at least partially (about 1% to about 100%) ionized. A plasma is made up of gas atoms, gas ions, and electrons. In the bulk phase, a plasma is electrically neutral. A thermal plasma can be created by passing a gas through an electric arc. The electric arc will rapidly heat the gas by resistive and radiative heating to very high temperatures within microseconds of passing through the arc. The thermal plasma is typically luminous at temperatures above 9,000 K.

A plasma can be produced with any gas in this manner. This gives excellent control over chemical reactions in the plasma as the gas might be neutral (argon, helium, neon), reductive (hydrogen, methane, ammonia, carbon monoxide) or oxidative (oxygen, nitrogen, carbon dioxide). The details of plasma generating torches are well known and need not be further detailed within this disclosure to make the present invention understandable to those skilled in the art.

An incoming stream of plasma gas is denoted by arrow 31. The plasma gas can also be a reactant or it can be inert. Preferably, the plasma gas is hydrogen as it is a product of the inventive process and thereby, argon separation or separation of another non-hydrogen plasma gas from the product stream is eliminated.

A gaseous stream of one or more reactants (arrow 30) is normally injected separately into the plasma 29, which is directed toward the downstream outlet of reactor chamber 20. The gaseous stream moving axially through reactor chamber 20 includes the reactants injected into the plasma arc or within a carrier gas. A carrier gas is also preferably hydrogen, if a carrier gas is used.

Reactant materials are usually injected downstream of the location where the arc attaches to the annular anode 13 of the plasma generator or torch. Materials which can be injected into the arc region include natural gas, such as is used in the Huels process for the production of ethylene and acetylene from natural gas.

Gases and liquids are the preferred forms of injected reactants. Solids may be injected, but usually vaporize too slowly for chemical reactions to occur in the rapidly flowing plasma gas before the gas cools. If solids are used as reactants, they will usually be heated to a gaseous or liquid state before injection into the plasma.

A convergent-divergent nozzle 22 is coaxially positioned within the outlet of the reactor chamber 20. The converging or upstream section of the nozzle restricts gas passage and controls the residence time of the hot gaseous stream within the reactor chamber 20, allowing its contents to reach thermodynamic equilibrium. The contraction that occurs in the cross-sectional size of the gaseous stream as it passes through the converging portions of nozzle 22 change the motion of the gas molecules from random directions, including rotational and vibrational motions, to a straight line motion parallel to the reactor chamber axis. The dimensions of the reactor chamber 20 and the incoming gaseous flow rates are selected to achieve sonic velocity within the restricted nozzle throat. Additionally, the length of reactor chamber 20 is configured to achieve the reaction products that will facilitate the desired end products of diatomic hydrogen and elemental carbon.

As the confined stream of gas enters the throat and diverging or downstream portions of nozzle 22, it is subjected to an ultra fast decrease in pressure as a result of a rapid increase in volume along the conical walls of the nozzle exit. The resulting pressure change rapidly lowers the temperature of the gaseous stream to a new equilibrium condition.

An additional reactant, such as hydrogen at ambient temperatures, can be tangentially injected into the diverging section of nozzle 22 (arrow 32) to complete the reactions or prevent back reactions as the gases are cooled. Supply inlets for the additional reactant gas are shown in FIG. 1 at 23.

Numerals 24 and 25 designate a coolant inlet and outlet, respectively, for the double-walled structure of the reactor chamber 20. Coolant flow is indicated by arrows 33 and 34. The walls of nozzle 22 and a coaxial cool-down chamber 26 downstream from it may also be physically cooled to minimize reactions along their inner wall surfaces.

Reaction product particles are collectable within a cyclone separator shown generally at 27. A downstream liquid trap 28, such as a liquid nitrogen trap, can be used to condense and collect reactor products within the gaseous stream prior to the gaseous stream entering a vacuum pump 39.

Figure 2:
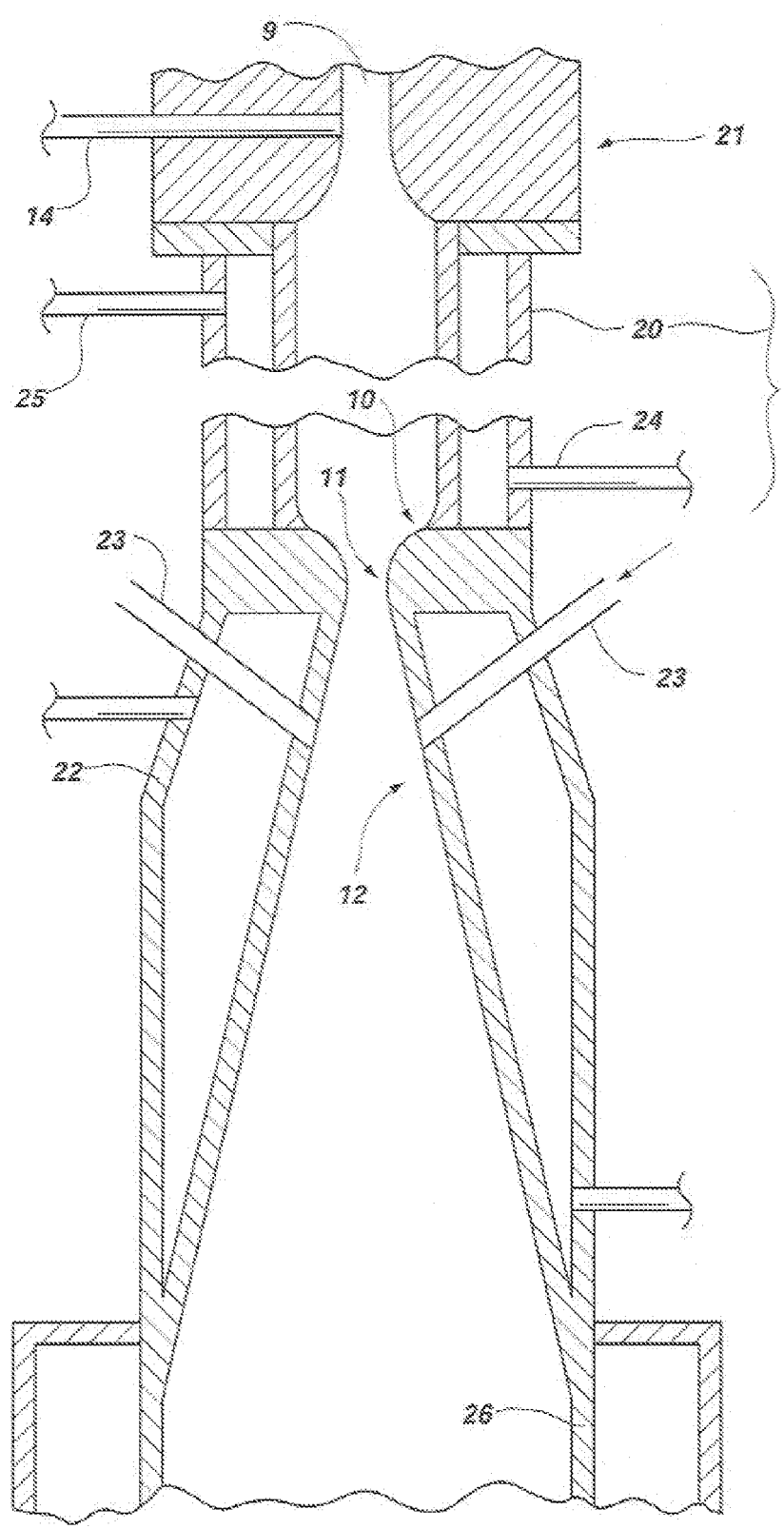
FIG. 2 is an enlarged cross-sectional view of the reactor chamber and converging-diverging nozzle.

FIG. 2 further illustrates details of the converging-diverging nozzle 22. The same reference numerals are used in FIG. 2 as in FIG. 1. By proper selection of nozzle dimensions, reactor chamber 20 can be operated at atmospheric pressure or in a pressurized condition, while cool-down chamber 26 downstream from nozzle 22 is maintained at a vacuum pressure by operation of pump 39. The sudden pressure change that occurs as the gaseous stream traverses nozzle 22 brings the gaseous stream to a lower equilibrium condition instantly and prevents unwanted back reactions that would occur under more drawn out cooling conditions.

Typical residence times for materials within the free-flowing plasma are on the order of milliseconds. To maximize mixing with the plasma gas, the reactants (liquid or gas) are injected under pressure (from about 10 to about 100 atmospheres) through a small orifice at feed stream inlet 14 to achieve sufficient velocity to penetrate and mix with the plasma. It is preferable to use gaseous or vaporized reactants whenever practical, since this eliminates need for a phase change within the plasma and improves the kinetics of the reactor. In addition, the injected stream of reactants is injected about normal (about a 90° angle) to the flow of the plasma gases. In some cases, positive or negative deviations from this 90° angle by as much as 30° may be preferred.

The high temperature of plasma 29 within reactor chamber 20 rapidly vaporizes the injected feed stream entering at inlet 14 and breaks apart gaseous molecular species to their atomic constituents. A variety of products are produced, principally diatomic hydrogen and elemental carbon with minor amounts of acetylene, and acetylene black, among others. The products can be synthesized by injecting reactants in liquid or gaseous form into a plasma of the appropriate gas downstream from the anode arc attachment point and within the torch exit or along the length of the reactor chamber. Diatomic hydrogen and elemental carbon are especially preferred products made according to this invention.

Reactor chamber 20 is the location in which the preferred chemical reactions occur to preferred reaction products of hydrogen and acetylene with minor impurities. It begins downstream from the plasma arc inlet 9 and terminates at an outlet end 10 of reactor chamber 20. Outlet end 10 leads to the nozzle throat 11. It includes the reactor areas in which reactant injection/mixing and product formation occurs, as well as the converging section of the quench nozzle.

Temperature requirements within reactor chamber 20 and its dimensional geometry are specific to the temperature required to achieve an equilibrium state with an enriched quantity of each desired reaction product of hydrogen and acetylene. Factors that affect equilibrium include power to the plasma torch, reactor chamber length, hydrocarbon gas flow rate and temperature, and others. Conditions taught herein, along with conditions taught in U.S. Pat. No. 5,935,293, in U.S. provisional application entitled, Thermal Device and Method for Production of Carbon Monoxide and Hydrogen By Thermal Dissociation of Hydrocarbon Gases, filed on May 24, 1999, and U.S. Pat. No. 5,749,937 may assist one of ordinary skill in the art to establish other conditions for the inventive conversion of a light hydrocarbon stream into the preferred end product of elemental carbon and diatomic hydrogen. The disclosure of the above-cited disclosures are incorporated herein by reference.

There is a substantial difference in temperature gradients and gaseous flow patterns along the length of the reactor chamber 20. At the plasma arc inlet 9, flow is turbulent and there is a high-temperature gradient; from temperatures of about 20,000 K at the axis of the chamber to about 375 K at the chamber walls. At nozzle throat 11, the gaseous flow is laminar, the bulk temperature is in a range from about 500° C. to about 4,000° C., and there is a very low temperature gradient across its restricted open area. Preferably with the present invention, the temperature at reactor outlet end 10 is about 2,000° C.

Since reactor chamber 20 is an area of intense heat and chemical activity, it is necessary to construct reactor chamber 20 of materials that are compatible with the temperature and chemical activity to minimize chemical corrosion from the reactants and to minimize melting degradation and ablation from the resulting intense plasma radiation. Reactor chamber 20 may be constructed of water-cooled stainless steel, nickel, titanium, or other suitable materials. Reactor chamber 20 can also be constructed of ceramic materials to withstand the vigorous chemical and thermal environment.

The walls of reactor chamber 20 are internally heated by a combination of radiation, convection and conduction. Cooling of the reactor chamber walls prevents unwanted melting and/or corrosion at their surfaces. The system used to control such cooling should maintain the walls at as high a temperature as can be permitted by the selected wall material, which must be inert to the reactants within the reactor chamber at the expected wall temperatures. This is also true with regard to the nozzle walls, which are subjected to heat only by convection and conduction.

The dimensions of the reactor chamber 20 are chosen to minimize recirculation of the plasma and reactant gases and to maintain sufficient heat (enthalpy) going into the nozzle throat 11 to prevent degradation (undesirable back or side reaction chemistry).

The length of the reactor chamber 20 may be determined experimentally by first using an elongated tube within which the user can locate the target reaction threshold temperature. Reactor chamber 20 can then be designed long enough so that reactants have sufficient residence time at the high reaction temperature to reach an equilibrium state and complete the formation of the desired reaction products. Such reaction temperatures can range from a minimum of about 1500° C. to about 4000° C.

The inside diameter of the reactor chamber 20 is determined by the fluid properties of the plasma and moving gaseous stream It must be sufficiently great to permit necessary gaseous flow, but not so large that undesirable recirculating eddies or stagnant zones are formed along the walls of the chamber. Such detrimental flow patterns will cool the gases prematurely and precipitate unwanted products, such as subchlorides or carbon. As a general rule, the inside diameter of the reactor chamber 20 should be in the range of 100 to 150 percent of the plasma diameter at the inlet end of the reactor chamber.

The purpose of the converging section of nozzle 22 is to compress the hot gases rapidly into a restrictive nozzle throat 11 with a minimum of heat loss to the walls while maintaining laminar flow and a minimum of turbulence. This requires a high-aspect-ratio change in diameter that maintains smooth transitions to a first steep angle (>45°) and then to lesser angles (<45°) leading into nozzle throat 11.

The purpose of nozzle throat 11 is to compress the gases and achieve super sonic velocities in the flowing hot gaseous stream. This converts the random energy content of the hot gases to translational energy (velocity) in the axial direction of gas flow. This effectively lowers the kinetic temperature of the gases and almost instantaneously limits further chemical reactions. The velocities achieved in nozzle throat 11 and in the downstream diverging section of nozzle 22 are controlled by the pressure differential between the reactor chamber 20 and the section downstream of the diverging section of nozzle 22. Negative pressure can be applied downstream or positive pressure applied upstream for this purpose.

The purpose of the diverging section of nozzle 22 is to accelerate and expand gases exiting nozzle 22 from sonic to supersonic velocities, which further lowers the kinetic temperature of the gases. It was discovered in the present invention that a free expansion is preferable to a gradual expansion as part of the inventive method to further decompose the unsaturated hydrocarbons, such as acetylene, into more diatomic hydrogen and elemental carbon.

The term "acceleration" in practice requires use of a diverging angle of equal to or greater than 35 degrees to expand the gases to achieve the effects of separation from the converging wall and inducing turbulence. Separation of the expanding gases from the diverging wall causes recirculation of some portion of the gases between the wall and the gas jet exiting nozzle throat 11. This recirculation in turn results in local reheating of the expanding gases and desirable further degradation reactions, producing higher yields of desired end products.

Physics of the Nozzle

The fast quench phenomena observed in this reactor is achieved by rapidly converting thermal energy in the gases to kinetic energy via a modified adiabatic and isentropic expansion through converging-diverging nozzle 22. In the process, the gas temperature and pressure drop extremely fast and the gas reaches supersonic velocity. It is preferable to first raise the temperature of the reactants in the reactor chamber to a level at which the desired end product is more stable than other reaction products in equilibrium with it. This is normally a consequence of the fact that the free energy of the desired end product will decrease at the selected elevated temperatures in comparison to the remaining reaction products. However, this window of opportunity is very short-lived about ($<10^{-3}$ sec or shorter) in a high-temperature reactor. To stabilize maximum conversion of the reaction product, it is necessary to rapidly cool the emerging gas below a selected cooling temperature to force it to a lower equilibrium state and thereby prevent decomposition of the end product.

One distinct advantage of the present invention relates to the production of ultrafine elemental carbon in the particle size range from about 1 nm to about 1,000 nm, preferably from about 2 nm to about 500 nm, and most preferably from about 10 nm to about 100 nm. Under ordinary conditions, the generation of a plasma from a light hydrocarbon stream will form hydrocarbons and soot materials that are carbon particles with a diameter larger than the ultrafine particles by a factor of at least about two and more likely by a factor of at least about 10. Under the present invention, although the inventors do not want to be bound to a single theory, it is believed that the rapid expansion of ionized species creates ultrafine carbon particles due to the freezing effect of the ionized species before they are able to combine with a sufficient number of other species to form soot materials as defined.

To understand the quench phenomenon in this reactor, it is necessary to investigate the changes in the temperature, pressure, and velocity of the gases as a function of changes in reactor geometry.

Reactor nozzle 22 (FIG. 2) can be divided into three sections; the convergent reactor chamber 10, the nozzle throat 11, and the divergent quench chamber 12. The entrance angle to the throat area, the cross-sectional area of the throat, and the diverging angle after the throat all exert influence on the temperature, pressure, and velocity profiles of the plasma gas.

In converging-diverging nozzle 22, the gas is flowing from a higher pressure $P_0$ to a lower pressure $P_1$. During passage of the gas through nozzle 22, there will be a rapid transformation of thermal energy to kinetic energy. This kinetic energy will give rise to a high gas velocity after discharging from nozzle 22. The gas enters the converging section at a low velocity and will emerge at the diverging section with a higher velocity.

The velocity of the gas in the throat of the nozzle, assuming adiabatic expansion, will achieve sonic values. When the gas accelerates through the nozzle throat, the temperature of the gas will simultaneously drop rapidly. As a result of high-velocity cooling, the initial gas temperature ($T_o$) will drop to a lower temperature, $T_1$, upon exiting from the nozzle. This rapid temperature quenching through a nozzle freezes the high-temperature equilibrium products of a high-temperature gas phase reaction. The pressure and temperature drop resulting from adiabatic expansion in a converging-diverging nozzle is described in the following equation:

$$\left(\frac{P_0}{P_1}\right)^{\frac{\gamma-1}{\gamma}} = \frac{T_0}{T_1}$$

$P_0$, $P_1$, $T_0$ and $T_1$ are initial and final pressures and temperatures of the gas, respectively. $\gamma$ is the ratio of $C_p/C_v$, where $C_p$ and $C_v$ are the heat capacities at constant pressure and volume, respectively. At 2500 K, $\gamma$ is 1.66 for Ar, 1.30 for $H_2$, and 1.11 for $C_2H_2$. This equation can be used to estimate the temperature drop across the nozzle throat if the initial and final pressures of the gases are known or vice versa. The mass flow rate, m, is related to the cross-sectional area (A*) of the nozzle throat, the velocity (V) and the specific volume ($\Omega$) of the gas at the throat. The specific volume ($\Omega$) is the inverse of gas density at the cross section.

$$\dot{m} = \left(\frac{V}{\Omega}\right) \times A^*$$

After substituting $T_0$, $P_0$, $\gamma$, M (molecular weight), and R (the gas constant) for $V/\Omega$, the equation takes the form:

$$\dot{m} = \left(\frac{P_0 M}{RT_0}\right)\left(\frac{\gamma RT_0}{M}\right)^{1/2} \times \left(\frac{2}{\gamma+1}\right)^{\frac{(\gamma+1)}{2(\gamma-1)}} \times A^*$$

This equation has been used to guide the design of the nozzle diameters used in the reactors built to date. Despite the assumption for constant $\gamma$ (which is valid for an argon plasma), the equation has been quite accurate in predictions of mass flow as a function of temperature, pressure, molecular weight, and nozzle diameter compared to experimental results.

The velocity of the expanding gas in mach number (Ma) is related to temperature (T), pressure (P), density ($\varrho = \Omega^{-1}$), and nozzle area (A) by the following equations:

$$\frac{T_0}{T_1} = 1 + \frac{\gamma - 1}{2}(Ma)^2$$

$$\frac{P_0}{P} = \left[1 + \frac{\gamma - 1}{2}(Ma)^2\right]^{\gamma/(\gamma - 1)}$$

$$\frac{\rho_0}{\rho} = \left[1 + \frac{\gamma - 1}{2}(Ma)^2\right]^{\gamma/(\gamma - 1)}$$

$$\frac{A}{A^*} = \frac{1}{Ma}\left\{\frac{2}{\gamma + 1}\left[1 + \frac{\gamma - 1}{2}(Ma)^2\right]\right\}^{(\gamma + 1)/[2(\gamma - 1)]}$$

In the last equation above, A* is the cross-sectional area at the throat of the nozzle and A is the cross-sectional area of the converging-diverging section. Substituting T0/T into the equation, it becomes:

$$\frac{A}{A^*} = \frac{1}{Ma}\left\{\frac{2}{\gamma + 1} \times \frac{T_0}{T}\right\}^{(\gamma + 1)/[2(\gamma - 1)]}$$

Figure 3:
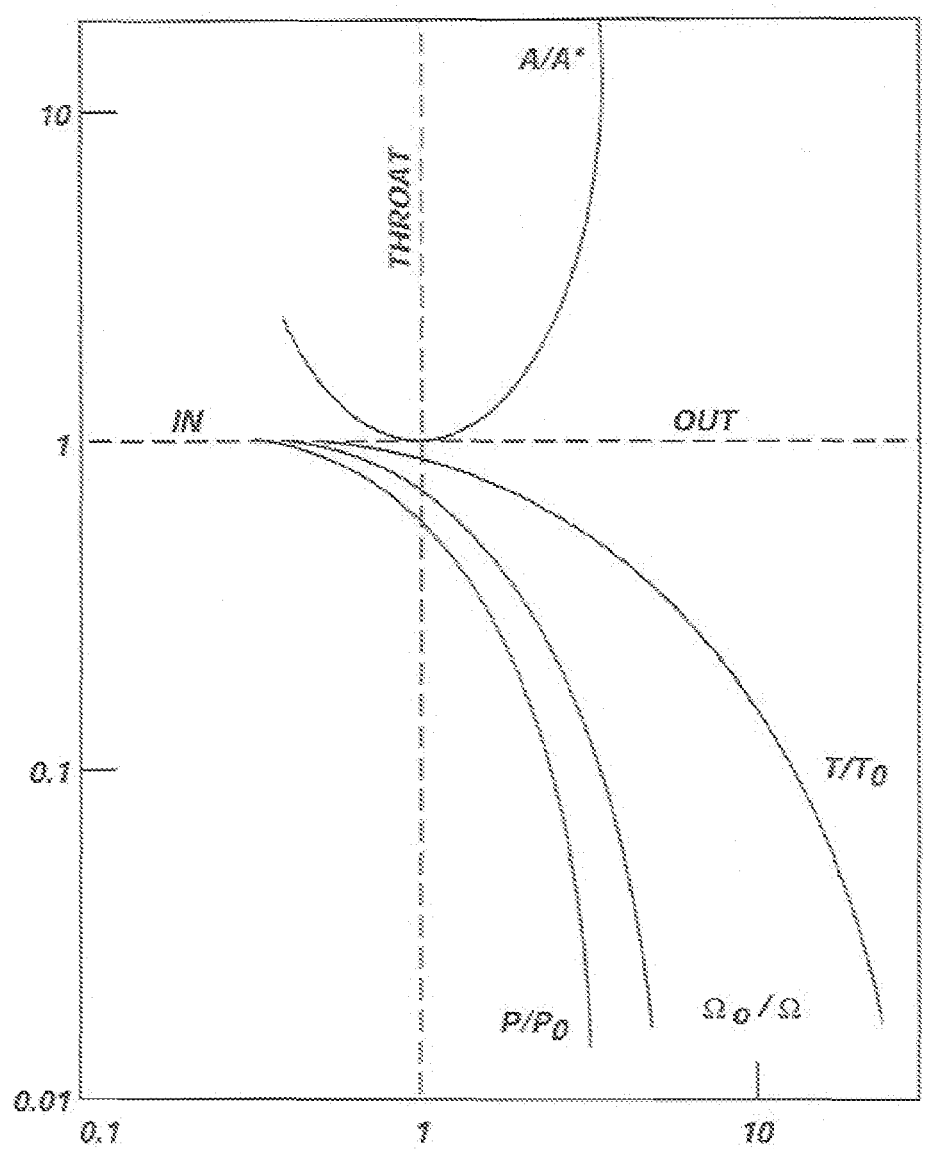
FIG. 3 is a plot of temperatures, pressures, specific volumes and nozzle throat areas as a function of gas velocity in the reactor apparatus.

FIG. 3 is a plot of $T/T_0$, $P/P_0$, $\Omega_0/\Omega$, and A/A* through a nozzle throat as a function of the gas velocity (in Ma) for $\gamma = 1.3$ ($H_2$). It clearly demonstrates that both gas temperature and pressure quench rapidly upon exiting the nozzle. The resulting high gas velocity lends itself to the application of a gas turbine to recover some of the energy as electricity to supplement the process.

Diatomic Hydrogen and Elemental Carbon Monoxide from a Light Hydrocarbon

One preferred method for producing diatomic hydrogen and elemental carbon from a light hydrocarbon involves directing a light hydrocarbon gas into a hot plasma torch operated at about 50 to 100 kWhr input power at about 300 Volts DC. A hydrogen plasma gas, preferably 100 percent hydrogen, may be used. The hydrogen plasma gas may include hydrogen as a mixture of argon and hydrogen as the plasma gas (95% Argon: 5% Hydrogen, by volume). Because a remote site process is contemplated, a substantially pure hydrogen source is preferred as the plasma gas source. Accordingly, the hydrogen gas may be manufactured on site.

The plasma gas is used to decompose the feed gas to diatomic hydrogen and unsaturated hydrocarbons such as acetylene. Decomposition is followed by rapid expansion of the resulting hot gases and heating the resulting gases to further decompose the unsaturated hydrocarbon such as acetylene. Finally, cooling with additional gases may be done to retain the diatomic hydrogen and elemental carbon in a substantially unaltered and stable room temperature state.

The plasma gas may be fed to the inventive reactor at a rate in a range from about 400 to 800 cubic feet per hour. For dimensional analysis purposes, subject to scaling up to different capacities, the 400 to 800 cubic feet per hour plasma gas feed rate may be matched by a light hydrocarbon feed gas rate (of, for example, methane or natural gas) of between about 200 and about 1,200 cubic feet per hour.

Figure 4:
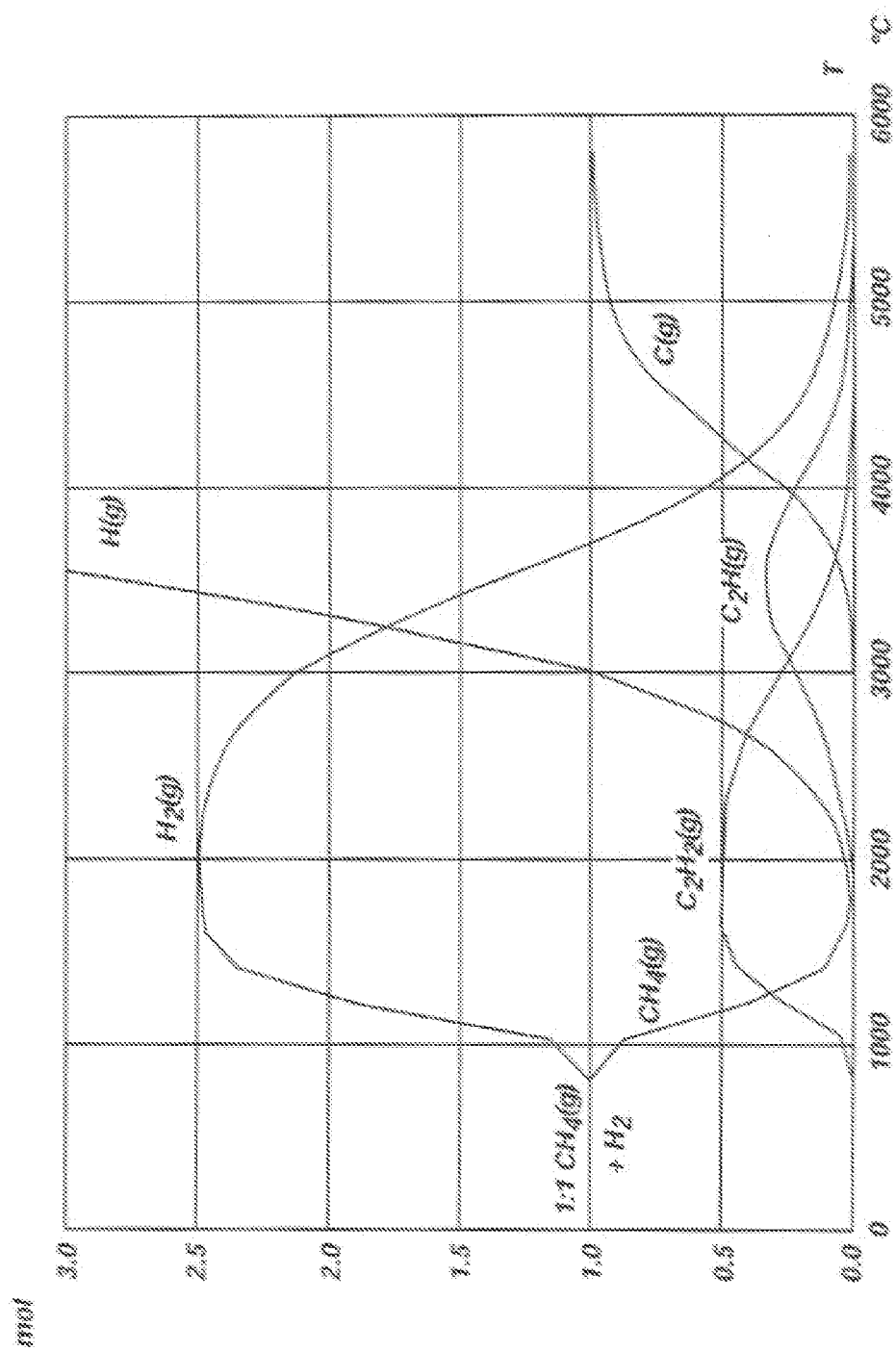
FIG. 4 is a graph plotting equilibrium concentrations in a methane system as a function of temperature.

FIG. 4 is an equilibrium diagram that shows methane and its decomposition products as a function of temperature wherein conditions cause both diatomic hydrogen and acetylene to form. In FIG. 4, methane begins to decompose at about 1,000° C. and higher. At about 2,000° C., the methane is about completely decomposed and reformed into diatomic hydrogen and acetylene. The system represented at about 2,000° C. illustrates one preferred equilibrium point. In the system at about 2,800° C., species such as monatomic hydrogen and $C_2H$ begin to be formed.

The length of the reactor is chosen, in connection with temperature requirement, such that the preferred equilibrium state of the system exists at the nozzle throat. It is preferable to form chemical species of unsaturated hydrocarbons such as acetylene. Unsaturated hydrocarbons with a higher carbon count than $C_2$ may be formed if the size of the axial reactor is longer. It is preferable, however, to limit the length of the axial reactor.

The diameter and length (about 2.0 inch×about 4.0 inch) of the reactor chamber is chosen to obtain maximum mixing of plasma gas and reactant gas while maintaining a minimum of about 2,000° C. temperature at the entrance of the nozzle throat. The reactor chamber and converging/diverging nozzle were constructed from nickel 200 alloy to reduce corrosion. Standard equations were used to calculate the dimensions of the bell-shaped converging nozzle, nozzle throat diameter diverging angle, and diverging nozzle exit diameter.

| Reactants: | Methane |
|---|---|
| Plasma Torch: | 10 kW laboratory plasma torch at about 75–100 kWhr electrical energy<br>30 Volts, 400 Amps<br>Cathode: thoriated tungsten in water cooled copper<br>Anode: Water-Cooled Copper Cylinder 6.0 mm diameter × 20.0 mm in length |
| Plasma Gas: | 100% $H_2$ Average total gas flow was maintained at about 200 liters/min. |
| Reactant Injection: | Gaseous (200° C.) methane at the point where the plasma plume exits the plasma torch. The hot methane injection tubes, reactor chamber and converging/ diverging or converging/free expansion nozzle section were constructed from nickel 200 alloy to minimize corrosion. |
| Injection Rate: | Gaseous methane was injected in a range from about 400–600 liters/min. This resulted in a gas velocity in a range from about 3,000 ft/s to about 5,000 ft/s. |
| Reactor chamber: | Water-cooled Nickel 200 cylinder 6.0 mm × 20.0 mm |
| Converging Nozzle: | Bell shaped with 0.375 inner diameter radii |
| Nozzle throat: | 2.0 mm × 1.0 mm in length, determined from standard equations, |
| Diverging Nozzle: | Conical shaped with greater than about 35° included angle or a square expansion shape to allow free expansion. |
| Cool down section: | Water-cooled stainless steel, 0.88 inch inner diameter |
| Cyclone collectors: | Water-cooled stainless steel, 12.0 mm inlet and outlet diameter, 50.0 mm inside diameter body, designed to maintain high entrance and exit velocity |
| Off-Gas Cleanup: | After product collection the process gas was passed though a liquid nitrogen cold trap and HEPA filter to remove impurities before the gas entered the mechanical vacuum pump. |
| Vacuum System: | A mechanical vacuum pump was used to maintain pressure downstream from the nozzle throat at 5.0 to 10.0 Torr (mm Hg) |

FIGS. 1 and 2 pertain to an apparatus tested for converting methane. In the described preferred embodiment, the preferred product is diatomic hydrogen and elemental carbon and the reactant is methane. However, the illustrated apparatus is suitable for use with other compositions and compounds where plasma processing of the compound requires ultra fast quenching to prevent back reactions.

The plasma torch 21 located at the reactor chamber inlet thermally decomposes an incoming gaseous stream comprised of a light hydrocarbon, such as natural gas or methane, as the resulting gaseous stream moves axially through reactor chamber 20 in conjunction with a plasma gas. The resulting hot gaseous stream is then directed through the coaxial convergent nozzle 22. The location downstream of the convergent portion 10 of the nozzle 22 controls the residence time of the hot gaseous stream within reactor chamber 20, thereby allowing its contents to reach thermodynamic equilibrium. It also streamlines the flow of hot gases, converting their motion from random movement to straight-line movement along the central nozzle axis. The divergent portion 12 of nozzle 22 subjects the stream to an ultra fast decrease in pressure. Quenching streams of gas, normally at ambient temperature, may be introduced into the hot gaseous stream through inlets 23 as it passes through the nozzle. This rapidly cools the contents of the hot gaseous stream at a rate that condenses the carbon monoxide and inhibits formation of unwanted products.

The plasma reduction is based on a quasi equilibrium-temperature quench sequence in which the initiation of nucleation is controlled by passage of a heated gaseous stream through a converging-diverging nozzle geometry.

Conditions necessary for complete dissociation of a light hydrocarbon, such as methane or natural gas, in a hydrocarbon stream into diatomic hydrogen and elemental carbon can be estimated using free-energy minimization techniques which assume thermodynamic equilibrium.

FIG. 4 illustrates that as methane is heated, decomposition thereof is almost complete at or near about 1,000° C. Where it is desirable to minimize the occurrence of the H and $C_2H$ species, the reactor length is configured to freeze the system once it reaches about 2,000° C. At this temperature, the presence of $H_2$ and acetylene are significant.

In a rapidly cooling plasma system, one can think of the gas in equilibrium at temperature $T_0$ and pressure $P_0$ being suddenly quenched in temperature and pressure. At this temperature, the reactants should be well equilibrated. As the plasma cools, this characteristic rate increases until at a particular T and P, the cooling rate becomes greater than the equilibrium rate and the composition of the plasma is frozen. On further temperature decrease, the vapor pressure of one component subsystem becomes greater than the saturation vapor pressure and nucleation occurs. When this subsystem is charged, condensation is enhanced for that species.

Experimental conditions for selective formation of diatomic hydrogen and unsaturated hydrocarbon plasma depend on specific values of rate coefficients and upon the initial temperature and pressure $T_0$ and $P_0$ at which the plasma is frozen. Where the unsaturated hydrocarbon is acetylene, the diatomic hydrogen and acetylene product is also dependent on the cooling rate of the plasma and upon the geometry of the reactor. Of course, not all reaction pathways become frozen at the same temperature during quench.

The converging-diverging nozzle configuration used in supersonic flow applications offers possibilities to control both the temperature quench rate and the concentration at which the plasma becomes frozen during the expansion. The converging-diverging DeLaval nozzle and the associated Prandtl-Meyer expansion process are discussed in standard texts on compressible fluid flow. In such expansion nozzles, the hot plasma gas undergoes an approximate isentropic expansion and the energy in the gas (its enthalpy) is converted to unidirectional velocity in the diverging nozzle. When the exit pressure is sufficiently low, it is possible to reach supersonic speeds. Non-adiabatic expansion processes that are attained in practice aid in the resultant temperature search.

A number of experiments with methane gas injected into a hydrogen plasma are provided. The dimensions and geometry of the reactors are varied. Provisions are made for gas quenching at the throat exit.

Methane conversion to hydrogen and elemental carbon in an inventive high-temperature reactor and method follows the theoretical chemical reaction: $2CH_4 \rightarrow C_2H_2+H_2$. After the initial decomposition, the reaction products are reheated: $C_2H_2+H_2 \rightarrow 2H_2+2C$. In principle, under careful kinetic studies on the pyrolysis of methane, it has been shown that it is possible to obtain high yields of acetylene where the main by-product is hydrogen, instead of tars and acetylene black. Such studies also showed that pyrolysis in the presence of hydrogen suppressed carbon formation in the reactor chamber.

In practice, a range of other hydrocarbons, specifically the light olefins and solid carbon, may be formed as byproducts including acetylene if the reaction occurs under certain reactor and process conditions.

Experiments using the fast quench system of this disclosure revealed that the methane decomposition to acetylene is kinetics controlled rather than equilibrium controlled. These results point to the advantage of high quench rates which provide opportunities to preserve high-temperature equilibrium products.

EXAMPLES

The inventive method for thermally converting one or more hydrocarbon reactants in a thermodynamically stable high-temperature gaseous stream to at least one reaction product, comprises the following steps. The reactant stream is introduced at one axial end of a reactor chamber containing an ionized gas. The reactant stream is heated in the reactor chamber to form a diatomic hydrogen and acetylene reaction product stream. The reactor chamber has a predetermined length sufficient to effect heating of the methane reactant stream to a temperature at which diatomic hydrogen and acetylene are available as a major portion of a reaction product stream, at a location adjacent the outlet end of the reactor chamber. The reaction product stream is expanded through the outlet end of the reactor chamber to cool the gaseous stream by converting thermal energy to kinetic energy as the reaction product expands. During the expansion through either a nozzle or a free-expansion orifice, the reaction product stream reheats to decompose the acetylene into additional hydrogen and elemental carbon. As decomposed, the reaction product stream has been converted into the end product stream. The end product is then cooled to room temperature. The ionized gas is preferably hydrogen. The end product includes diatomic hydrogen and ultrafine carbon particles.

The quench reaction zone geometry was optimized by conducting two-dimensional modeling of the fluid dynamics of such a system. Modeling results determined that reaction zone diameter should be at least 150% of the plasma torch anode exit diameter. Other diameters are 200%, 500%, and 1,000%. This allows for recirculation of reaction gases in the reaction zone which contributes to further decomposition of the unsaturated hydrocarbons into elemental carbon and diatomic hydrogen.

Gas temperatures were measured experimentally along the reactor chamber and were also modeled using a two dimensional fluid dynamics model to determine the optimum length of the reaction zone before the converging section. A reaction zone length was chosen from this data for a given plasma input power level, plasma gas flow, and reactant input rate that would result in gas temperatures at the entrance to the nozzle throat to be equal to or preferably greater than the required equilibrium temperature of the desired end product.

A high-aspect-ratio converging section was designed such that the radius of the convex and concave surfaces leading into the nozzle throat were approximately equal to the diameter of the nozzle throat. This converging geometry allows achieving the highest possible velocity at the entrance to the nozzle throat while limiting heat loss to the walls of the converging section or separation of the gas flow from the converging surface.

The optimum area (diameter) of the nozzle throat was calculated from equations available in texts pertaining to nozzle design. The nozzle throat was designed so that with the temperature, gas composition, mass flow, and pressure of the gas entering the nozzle (known or estimated), sonic or near sonic gas velocities are achieved in the nozzle throat. To achieve maximum cooling (temperature drop), the nozzle throat should be as short as possible. This is demonstrated by two equations for two-dimensional nozzle flow, with R* and h* designating the radius of curvature and throat height respectively:

$$\left[\frac{d\left(\frac{T}{T_0}\right)}{dt}\right]^* = -(R^*h^*)^{1/2} \frac{\gamma-1}{\left(\frac{\gamma+1}{2}\right)^2} a_0$$

$$\left[\frac{d\left(\frac{T}{T_0}\right)}{dt}\right]^* = -Ca_0(R^*h^*)^{-1/2}$$

where $T_0$ and $a_0$ are the gas temperature and speed of sound, respectively, in the reaction zone. In the second equation above, all constants for a given gas are collected in C. As an illustrative example of how to arrive at the constant C, for air, gamma is equal to about 7/5C or about 1.4C, and it is, therefore, equal to about 0.278. Examination of these equations shows that greater cooling rates occur for smaller nozzle diameters and shorter nozzle lengths with generally smaller R* and h*.

The divergence angle and area at the exit of the diverging nozzle were determined from standard texts on fluid dynamics and aerospace rocket motor design. In addition, two dimensional models of fluid flow under expected experimental conditions were also used to optimize the divergence angle and exit area of the nozzle. A preferred divergence angle was greater than 25° and preferably in the range of about 35° to about 90° for optimum expansion and acceleration of the reaction product stream. The maximum exit area (diameter) of the diverging nozzle was again determined by calculation from equations available in standard texts on fluid flow and rocket engine design.

The maximum allowable nozzle exit area depends on the mass flow through the nozzle and pressure difference between the reaction zone and the downstream cooling section. Choice of a large expansion angle or a large exit area results in the gas flow "peeling off" or separating from the wall, which results in the preferred conditions of turbulence, gas recirculation, gas reheating, and side further decomposition reaction to obtain the desired end products of diatomic hydrogen and elemental carbon.

The purpose of the cool-down section of the plasma fast quench reactor device is to reduce the gas velocity while removing heat energy (which results from the decrease in velocity) in the gas at a rate sufficient to supply the cyclone separators effectively to achieve a solid-gas separation between the elemental carbon and the hydrogen.

Cool down of the reaction product gases has been accomplished by the length of water-cooled tube having the same internal diameter as the internal exit diameter of the diverging or free-expansion section of the nozzle. With other applications of this device, it may be more desirable to supplement gas cooling by use of other types of heat exchangers.

Plasma quench processes for production of ultrafine materials require product collection capability downstream of the quench nozzle, preferably downstream of the cool-down section. Cyclonic collectors of standard dimensions described in the literature are used for gas and mass flows several times smaller than called for in the literature. This accommodates sonic or near sonic gas velocities through the cyclones, which allows efficient removal of ultrafine material (2 to 1,000 nm diameter powders).

In addition to mass flow and nozzle diameter, the third process parameter that determines the temperature drop across the nozzle is the ratio of the up stream pressure ($P_0$, in reaction zone) to the downstream pressure ($P_1$, cool-down zone). Preferably, the ratio $P_0/P_1$ of about 0.01 to about 0.5 is maintained. The experimental systems were operated with the reaction zone pressure of approximately 700 to 800 Torr (about 1 atm.) and downstream pressure maintained between about 10 and about 200 Torr (0.26 to 0.01 atm.). In bench scale experiments, the low downstream pressure was accomplished using a mechanical vacuum pump.

In the following examples, the length and diameter of the reactor chamber are configured to maintain a temperature of about 2,000° C. at the entrance of the converging nozzle. The nozzle throat diameter is configured to achieve sonic velocity of the reaction product gas in the throat. Downstream from the nozzle throat, gas rapidly but gradually expands, geometrically speaking. The rapidly expanding gas acts to decompose any hydrocarbon gases such as acetylene, ethylene, and other low molecular weight hydrocarbons and others, that may have formed in the reactor chamber.

Elemental carbon and other solids such as acetylene black is separated from the end product stream by use of cyclones and the like or filters and the like or water and/or oil spray devices and the like.

The plasma gun is operated in a range from about 50 to about 100 kWhr input power at a potential in a range from about 100 to about 500 volts. Hydrogen plasma gas, as the preferred plasma gas, flows at a feed rate from about 300 to about 1,000 cubic foot per hour. Methane is supplied to the reactor chamber at a rate from about 100 to about 1,500 cubic foot per hour.

In the present invention, heating is preferably accomplished by introducing a stream of plasma arc gas to a plasma torch at the one axial end of the reactor chamber to produce a plasma within the reactor chamber which extends toward its remaining axial end. Cooling the reaction product is preferably accomplished by use of a restrictive convergent-divergent nozzle or a free expansion.

Figure 5:
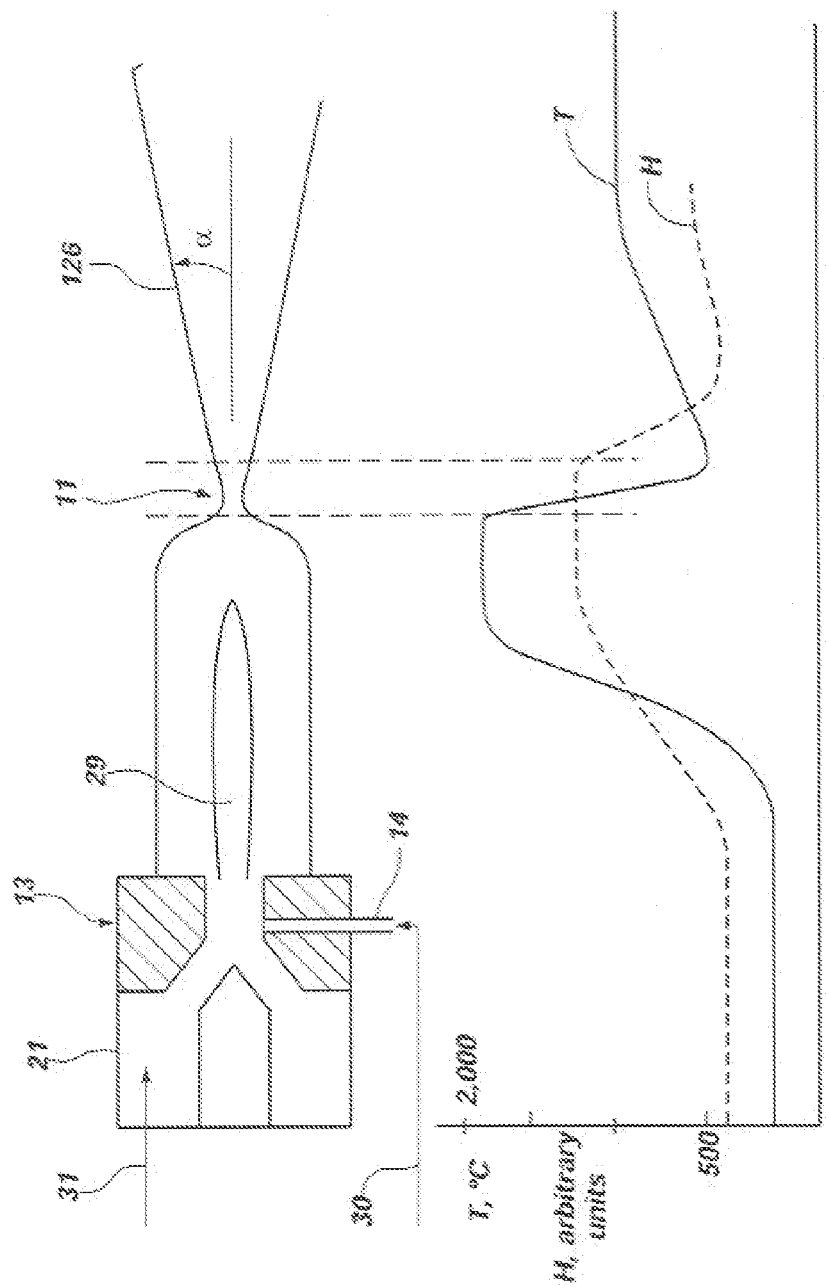
FIG. 5 is a cross-sectional view of a reactor chamber and expansion chamber system wherein a gradual expansion is illustrated thermodynamically.

FIG. 5 is a cross-sectional view of a reactor chamber and expansion chamber system 126 where a rapid expansion is illustrated thermodynamically. In comparison to previous work done by the inventors, a gradual expansion of reaction gases was realized to be an impediment to the formation of elemental carbon by the substantially complete decomposition of the unsaturated hydrocarbons. A gradual expansion of the reaction gases allowed the acetylene and/or other unsaturated hydrocarbons that were being formed in the reactor chamber, to resist further decomposition. In the previous technology developed for the production of such products as elemental titanium, a gradual expansion to prevent reheating and back reactions was important due to the highly reactive nature of the halides from which the elemental titanium had just been dissociated.

In contrast thereto, the present invention preferably decomposes the unsaturated hydrocarbons to the point of obtaining elemental carbon. As such, the remaining compounds are substantially all diatomic hydrogen. The hydrogen may then be liquified and used in processes such as an internal combustion engine or a hydrogen fuel cell. The combustion of hydrogen produces no greenhouse gases as illustrated: $H_2 + \frac{1}{2} O_2 \rightarrow H_2O$.

In FIG. 5, the angle alpha is preferably in a range greater than about 25 degrees, preferably greater than about 35 degrees to expand the gases to achieve the effects of separation from the diverging wall and inducing turbulence. In the previously disclosed technology, it was preferable to have a nozzle angle less than about 35 degrees in order to accomplish a gradual expansion. In the present invention, separation of the expanding gases from the diverging wall causes recirculation of some portion of the gases between the wall and the gas jet exiting nozzle throat 11. This recirculation in turn results in local reheating of the expanding gases and desirable further degradation reactions, producing higher yields of the desired end products of elemental carbon and diatomic hydrogen.

FIG. 5 also illustrates constant enthalpy of the gas as it moves through nozzle throat 11. As kinetic temperature is significantly reduced in nozzle throat 11, the reaction gases accelerate to hypersonic speeds. As such, temperature is dropped. The present invention comprises a method of thermally converting one or more hydrocarbon reactants in a gaseous stream to an end product in the form of a gas or ultrafine solid particles. First, a reactant stream is introduced at one axial end of a reactor at a preferred space time velocity. The preferred space time velocity is dependent upon the actual dimensions of the reactor and is calculated to achieve a preferred equilibrium state at nozzle throat 11.

A first heating of the reactant stream is carried out as the reactant stream flows axially toward outlet end 10 of the reactor. The reactor has a predetermined length sufficient to effect heating of the reactant stream to a selected temperature at which at least diatomic hydrogen and at least one unsaturated hydrocarbon product is available at or near equilibrium as an intermediate or reaction product stream at a location adjacent outlet end 10 of the reactor.

The intermediate or reaction product stream is expanded through a nozzle arranged at the outlet end of the reactor to rapidly cool the intermediate or reaction product stream by converting thermal energy to kinetic energy as a result of substantially adiabatic and isentropic expansion as the intermediate product stream flows axially through the nozzle. Thereby, the desired intermediate product stream is retained without undesirable side and back reactions.

A second heating is carried out on the intermediate product stream sufficient to decompose the intermediate product stream to principally a diatomic hydrogen and elemental carbon end product. Finally, the at least one end product and remaining intermediate product stream exiting from the nozzle are cooled to room temperature.

The reactant stream is preferably selected from methane, natural gas, and hydrocarbons. The hydrocarbons are preferably light hydrocarbons such as propane, butane, pentane, and hexane. Typically, the light hydrocarbons may include such impurities as nitrogen and sulfur as elemental constituents or as compounded constituents.

Preferably, as illustrated in FIG. 4, the first heating of the reactant stream comprises heating the reactant stream to about 2,000° C. as the reactant stream approaches nozzle throat 11. As such the first of heating the reactant stream is accomplished in a space time velocity that substantially prevents the formation of unsaturated hydrocarbons with more than two carbons therein. This preferred space time velocity allows for a more complete decomposition of the acetylene or other unsaturated $C_2$ hydrocarbons during the second heating.

The inventive method may include expanding the intermediate product stream through a convergent-divergent nozzle that has an angle, alpha, that allows for reheating of the product gases sufficient to decompose the unsaturated $C_2$ hydrocarbons during the second heating as illustrated in FIG. 5.

Figure 6:
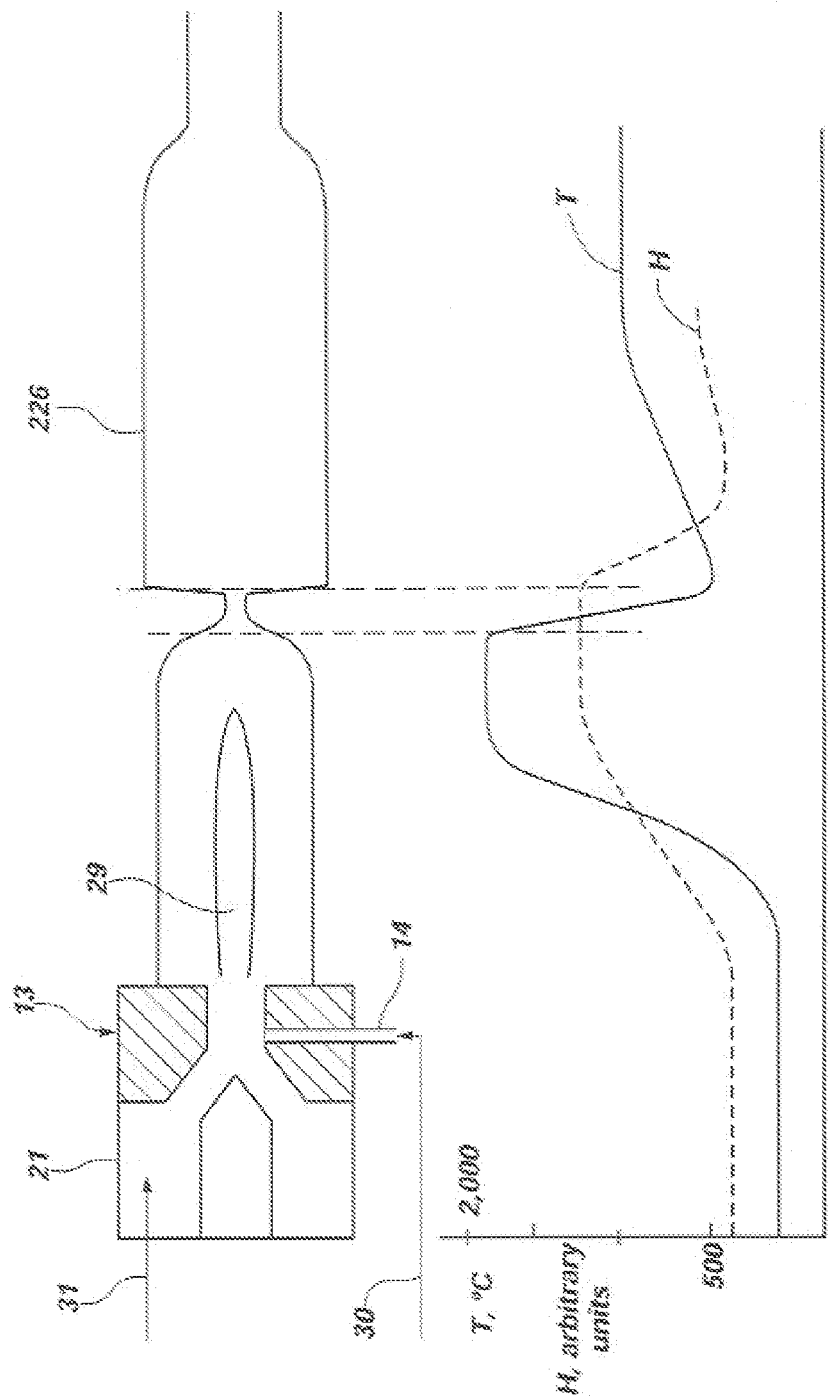
FIG. 6 is a cross-sectional view of a reactor chamber and expansion chamber system wherein a free expansion is illustrated thermodynamically.

FIG. 6 illustrates alternative reheating of the product gases by allowing the product gases to experience a substantially free expansion into an expansion chamber 226. Reheating occurs during the free expansion sufficient to decompose the unsaturated $C_2$ hydrocarbons during the second heating to principally elemental carbon and diatomic hydrogen. The free expansion experienced by the intermediate product stream experiences significant turbulence that allows the intermediate product stream to further decompose. Decomposition may be done by kinetic and thermal means.

Figure 7:
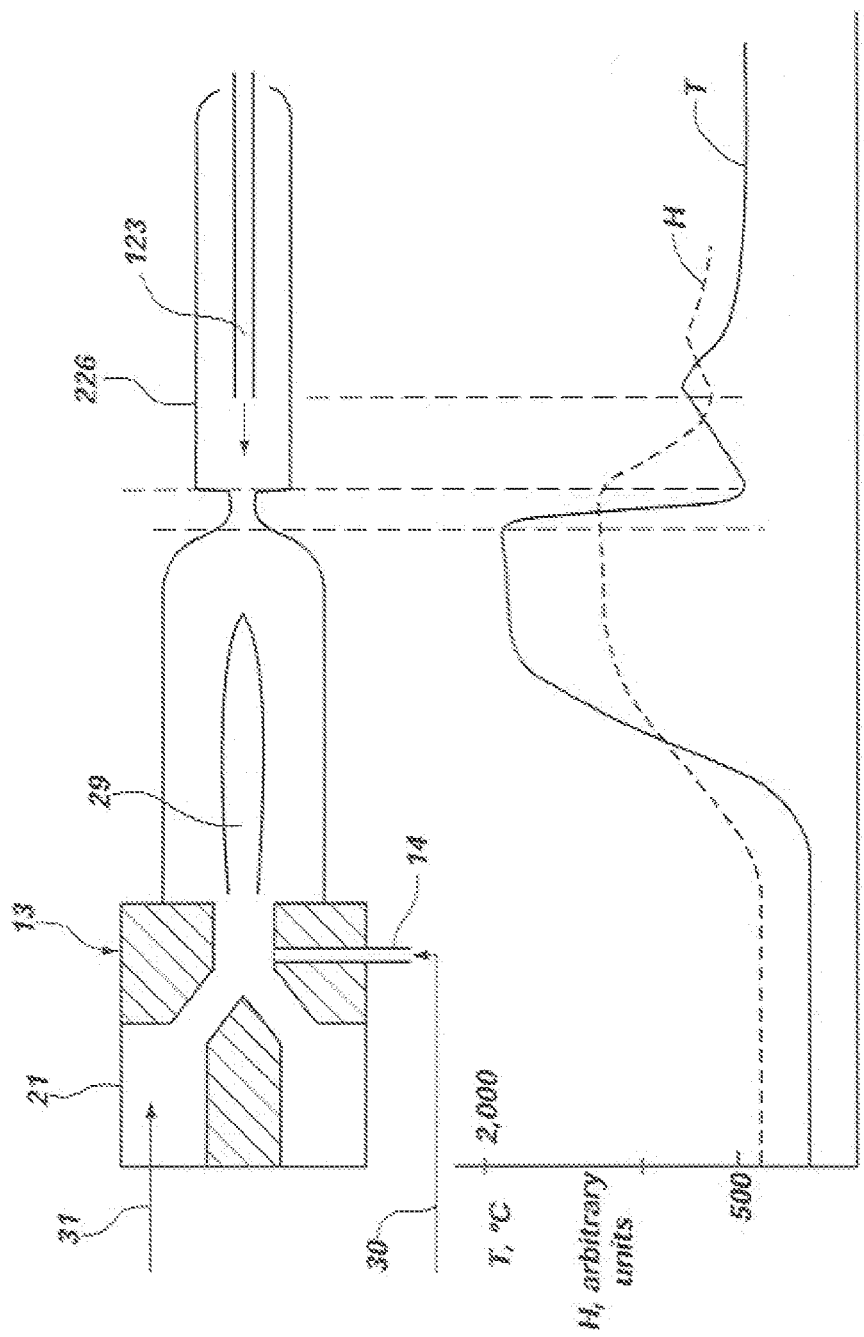
FIG. 7 is a cross-sectional view of a reactor chamber and expansion chamber system wherein a free expansion is assisted by injection of gas into the product stream to emulate an expansion nozzle.

FIG. 7 also illustrates the method of thermally converting one or more hydrocarbon reactants in a gaseous stream to an end product in the form of a gas or ultrafine solid particles. This alternative includes expanding the intermediate product stream through a free-expansion chamber 226 or a rapid or gradual divergent nozzle, followed by blending the intermediate product stream with a mixing gas, either by injecting dilution gas at an angle to axial flow through injectors or supply inlets 23 (FIG. 2), or by injecting directly into the axial flow through an injector 123, or a combination of both. Blending causes the intermediate product stream to become diluted and individual species from the intermediate product stream to become separated by the mixing gas.

As illustrated in FIGS. 5–7 expanding the intermediate product stream through a nozzle arrangement comprises supplying the intermediate product stream through a convergent nozzle at a velocity at which kinetic temperature drops by an absolute temperature factor of greater than about two. Preferably, the temperature drops from about 2,000° C. to about 500° C. The second heating may raise the temperature up to about 800° C. in order to accomplish decomposition of the intermediate product stream to at least a diatomic hydrogen and elemental carbon end product.

Expanding the intermediate product stream through a convergent nozzle with either a divergent nozzle or a free expansion may also be done at a velocity at which kinetic temperature drops by an absolute temperature factor of greater than about three. Additionally, expanding the intermediate product stream through a nozzle or a free-expansion nozzle may also be done at a velocity at which kinetic temperature drops by an absolute temperature factor of greater than about four.

In order to decompose the unsaturated hydrocarbons in the intermediate product stream, the second heating of the intermediate product stream is therefore preferably done by heating the expanded intermediate product stream by an absolute temperature factor of greater than about 1.25. Preferably, the second heating of the intermediate product stream is therefore preferably done by heating the expanded intermediate product stream by an absolute temperature factor of greater than about 1.4.

Figure 8:
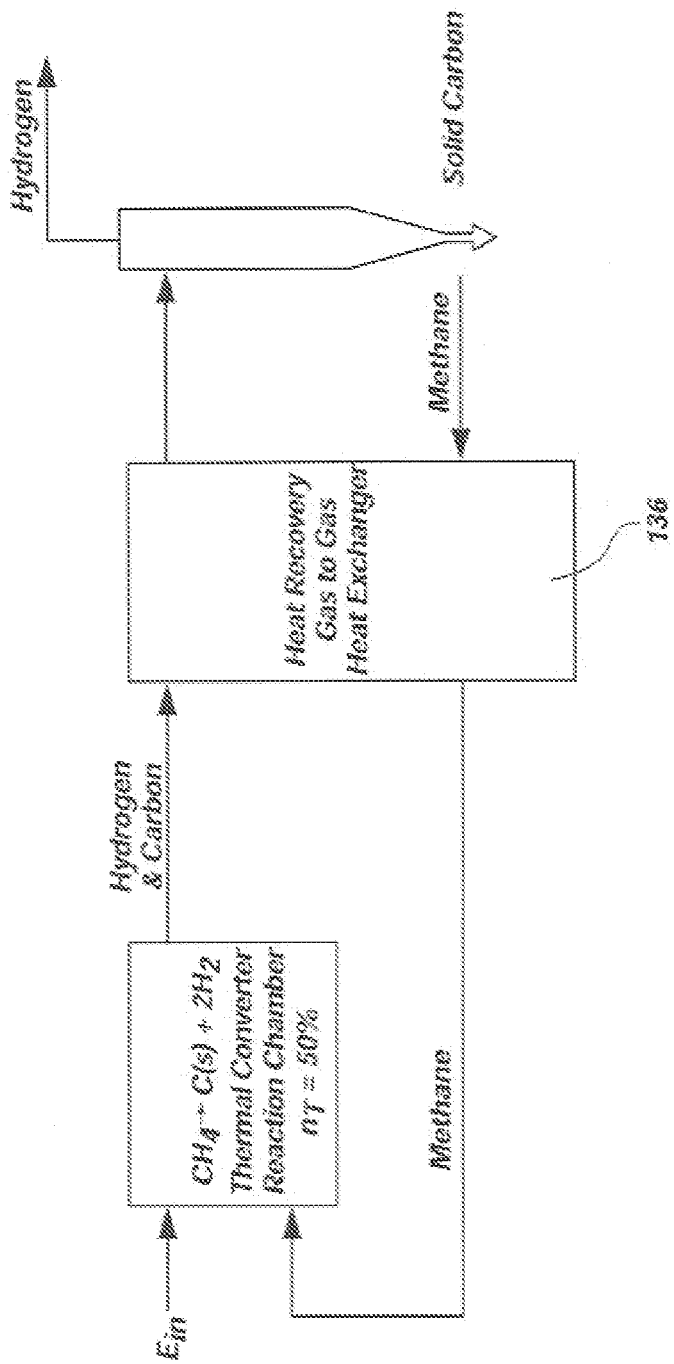
FIG. 8 is an overview of one embodiment of the invention wherein feed stream gas is preheated with product stream gas.

FIG. 8 illustrates a flow scheme in which the diatomic hydrogen, prior to separation from the elemental carbon, is used in an economizer heat exchanger (also referred to as a heat economizer) 136 to preheat feed stream gases such as methane, natural gases, or other light hydrocarbons. Alternatively, the economizer heat exchanger may be located at a flow point after the elemental carbon and other solids has been removed. The mass and energy flow rates depicted in FIG. 8 are for non-limiting illustrative purposes as examples of one scale of production. It is noted that "$E_{in}$" represents energy input and "$\eta_T$" represents thermal efficiency.

Figure 9:
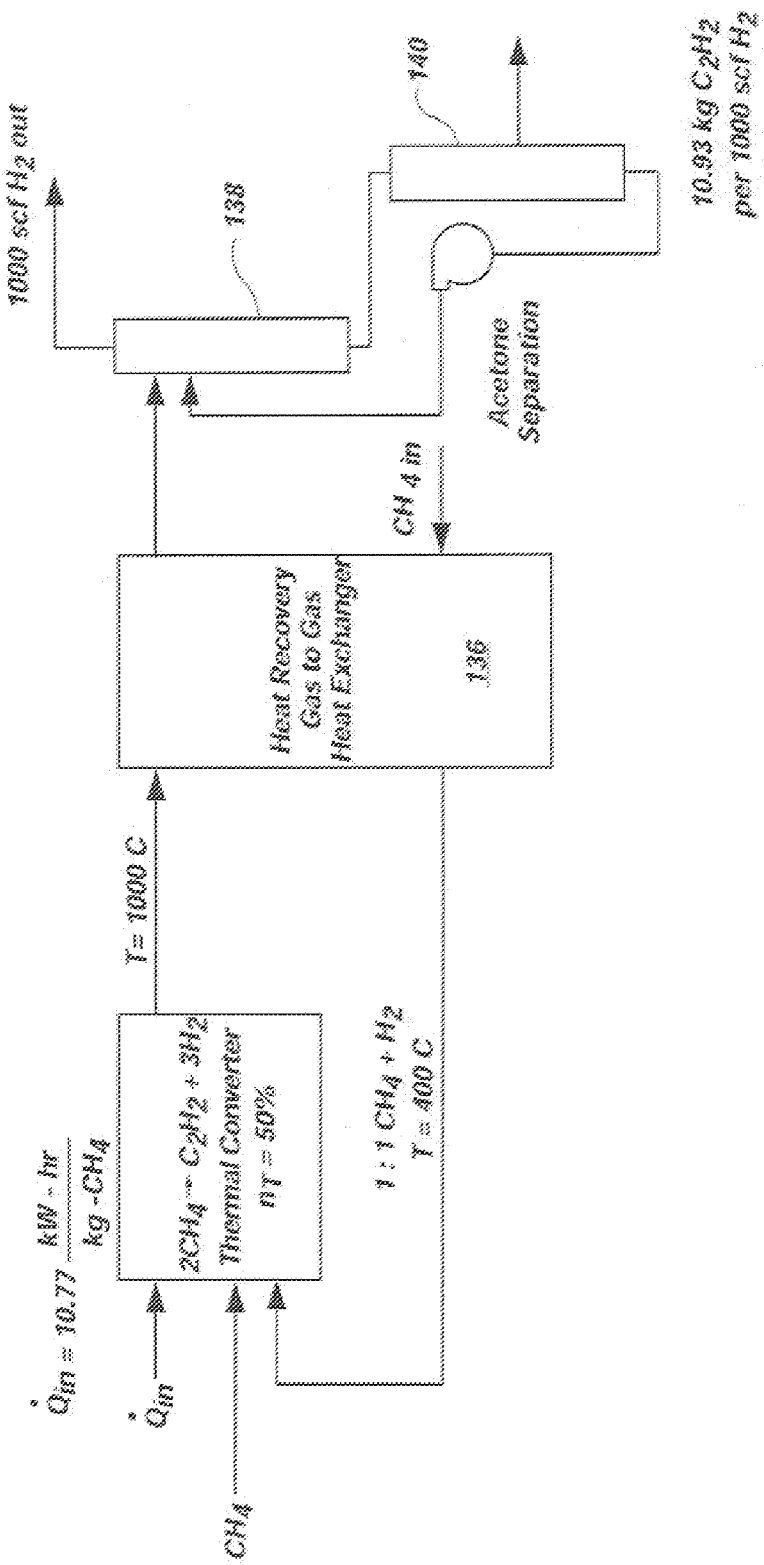
FIG. 9 is an overview of one embodiment of the invention wherein product stream gas is further treated to separate acetylene from hydrogen.

FIG. 9 is an overview of one embodiment of the invention wherein product stream gas is further treated to separate acetylene from hydrogen. In some applications, it may be preferable to allow some unsaturated hydrocarbons to pass through the expansion without total decomposition to elemental carbon and diatomic hydrogen. Where such an end product mix may be produced, separation of acetylene from hydrogen may be accomplished by acetone absorption of the acetylene. FIG. 9 illustrates the acetone absorption of acetylene in an absorber 138, followed by separation of acetylene from acetone in a separator 140. Other absorbents of the acetylene may be used, however, and other separation schemes may be employed such as membrane separation and the like. The mass and energy flow rates depicted in FIG. 9 are for non-limiting illustrative purposes as examples of one production sale. Absorber 138 and separator 140 are one example of a means for separating unsaturated hydrocarbons from the end product stream. It is noted that the 1:1 CH4+H2 reference indicates a molar ration of 1 mole of $CH_4$ to 1 mol of $H_2$ (which is a byproduct of the process).

Figure 10:
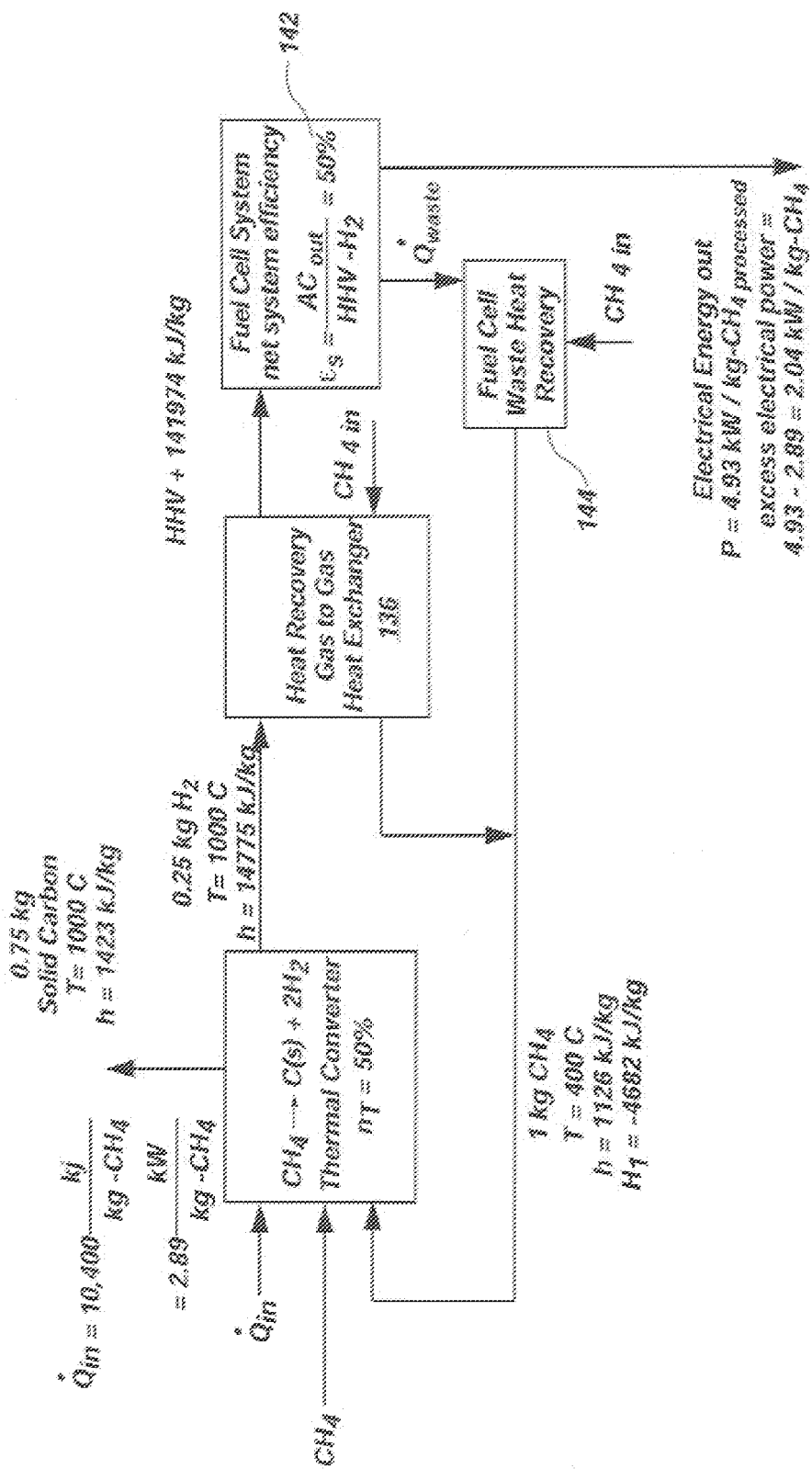
FIG. 10 is an overview of one embodiment of the invention wherein product stream gas is integrated with a hydrogen fuel cell.

FIG. 10 is an overview of one embodiment of the invention wherein product stream gas is integrated with a hydrogen fuel cell 142. This embodiment of the present invention is preferred where efficient generation of electrical power is needed, such as at a remote site, and where the waste heat that is generated in the fuel cell may be used as an economizer heat exchanger for the inventive process. FIG. 10 illustrates a first waste heat economizer 136 that assists in cooling the exit gases from the rapid expansion chamber by preheating the feed stream. After the separation of elemental carbon from the end product stream (not pictured), the diatomic hydrogen is used as a secondary feed stream to a hydrogen/light hydrocarbon fuel cell. Waste heat from the hydrogen/light hydrocarbon fuel cell may also be used to preheat the primary feed stream in a second waste heat economizer 144.

Although fuel cell 142 may be a hydrogen fuel cell or a hydrogen/light hydrocarbon fuel cell due to the presence of some amounts of undecomposed light hydrocarbons in the end product stream, it is also an embodiment of the present invention to provide light hydrocarbons to fuel cell 142, either alone or in concert with the diatomic hydrogen end product stream. The mass and energy flow rates depicted in FIG. 10 are for non-limiting illustrative purposes as examples of one scale of production. It is noted that "h" represents specific enthalpy, "$H_1$" and "$H_2$" represent total enthalpy at states 1 and 2, that "$\gamma_S$" represents system efficiency, "$AC_{out}$" represents the net electrical current out and "HHV" represents the higher heating value.

Figure 11:
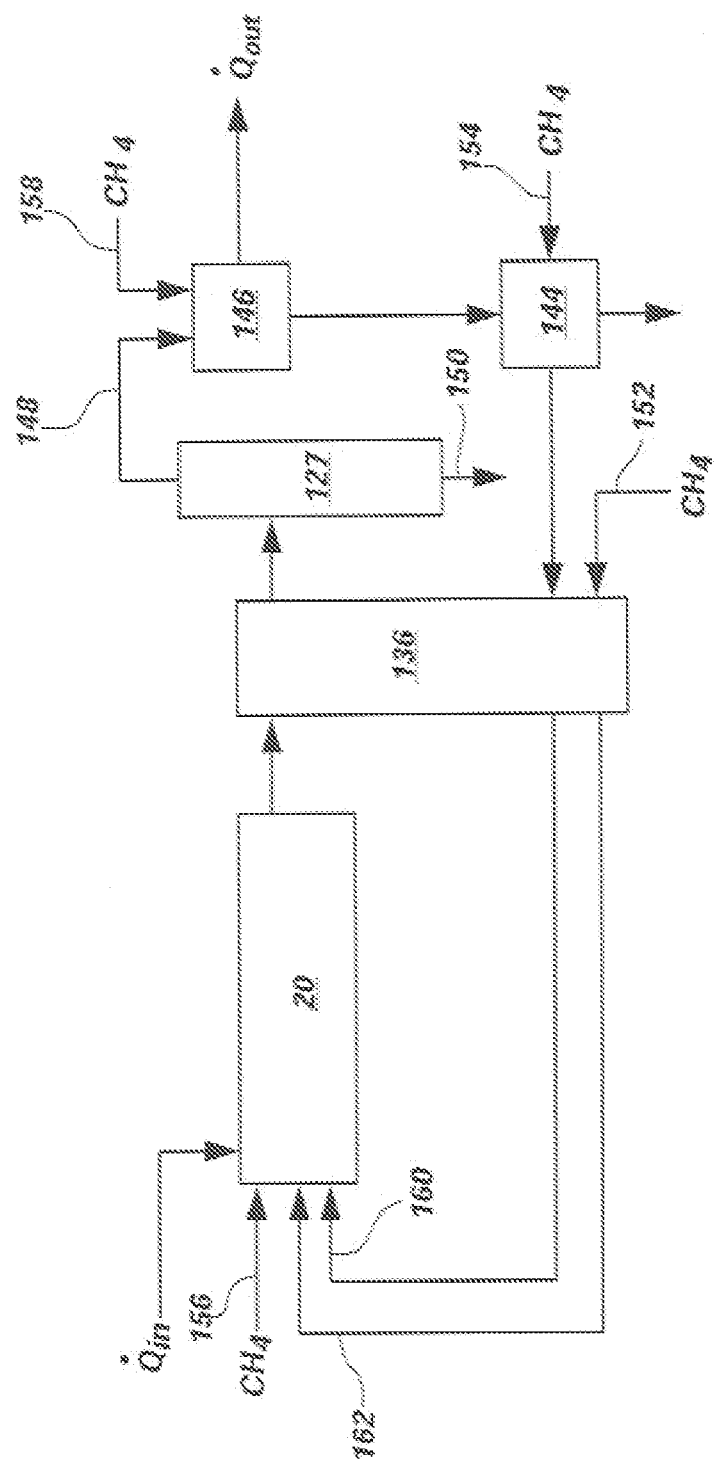
FIG. 11 is an overview of one embodiment of the invention wherein product stream gas provides a supply for an on-board system.

FIG. 11 illustrates another embodiment of the present invention. The inventive conversion of light hydrocarbons to elemental carbon and diatomic hydrogen is used in an on-board system.

FIG. 11 is an overview of the on-board system for an internal combustion engine 146 that may be powered either by a hydrocarbon fuel such as natural gas or by the diatomic hydrogen that is generated on board. The on-board system may be operated by feeding a hydrocarbon fuel such as natural gas in a feed stream 156 to reactor chamber 20. Conversion of the hydrocarbon fuel is carried out according to the present invention, whereby elemental carbon and diatomic hydrogen exit and pass through first waste heat economizer 136 and into cyclone 127. Cyclone 127 is one example of a means for recovering the carbon product and the diatomic hydrogen product.

Elemental carbon exits at stream 150, and diatomic hydrogen exits in stream 148. Internal combustion engine 146 receives hydrogen stream 148 and optionally may also receive a hydrocarbon stream 158. After combustion, effluent gases pass to second waste heat economizer 144. Optionally, a hydrocarbon feed stream 154 may originate at second waste heat economizer 144 in order to preheat the natural gas feed stream. The preheated natural gas feed stream exits second waste heat economizer 144 and enters first waste heat economizer 136, after which it passes therethrough and enters reactor chamber 20 as heated feed stream 160. Optionally, a hydrocarbon feed stream 152 may begin at first waste heat economizer 136 and be fed to reactor chamber 20 as preheated feed stream 162.

It can be seen that the light hydrocarbons may be supplied to the on-board system, either as a direct fuel for internal combustion engine 146 or as a fuel to be reformed into hydrogen as streams 156, 160, and 162. Any combination of the above feed streams may also be used according to a specific application. Elemental carbon stream 150 is allowed to exit the on-board system and may be collected and used as a precursor or feed material for other processes.

A preferred embodiment of the invention depicted in FIG. 11 includes the exclusive feed of hydrocarbons through feed stream 154. This embodiment comprises hydrocarbon feed stream 154 passing through second waste heat economizer 144, next passing through first waste heat economizer 136 and supplying reactor chamber 20 as preheated feed stream 160. In this preferred embodiment preheated feed stream 160 has attained a temperature that is higher than preheated feed stream 162 or feed stream 156 if they had been used. Thereby, the amount of energy that is needed to heat preheated feed stream 160, $Q_{IN}$ is reduced. The on-board system depicted in FIG. 11 uses natural gas or some other light hydrocarbon for its fuel. Because of the conversion of the light hydrocarbon to elemental carbon and diatomic hydrogen, and because elemental carbon stream 150 is not discharged to the environment as a greenhouse gas, the on-board system provides energy $Q_{OUT}$ with a substantially clean-burning fuel that was converted from a potential source of greenhouse gases.

FIG. 11 demonstrates that either liquid natural gas (LNG) or compressed natural gas (CNG) may be used to fuel internal combustion engine 146.

Figure 12:
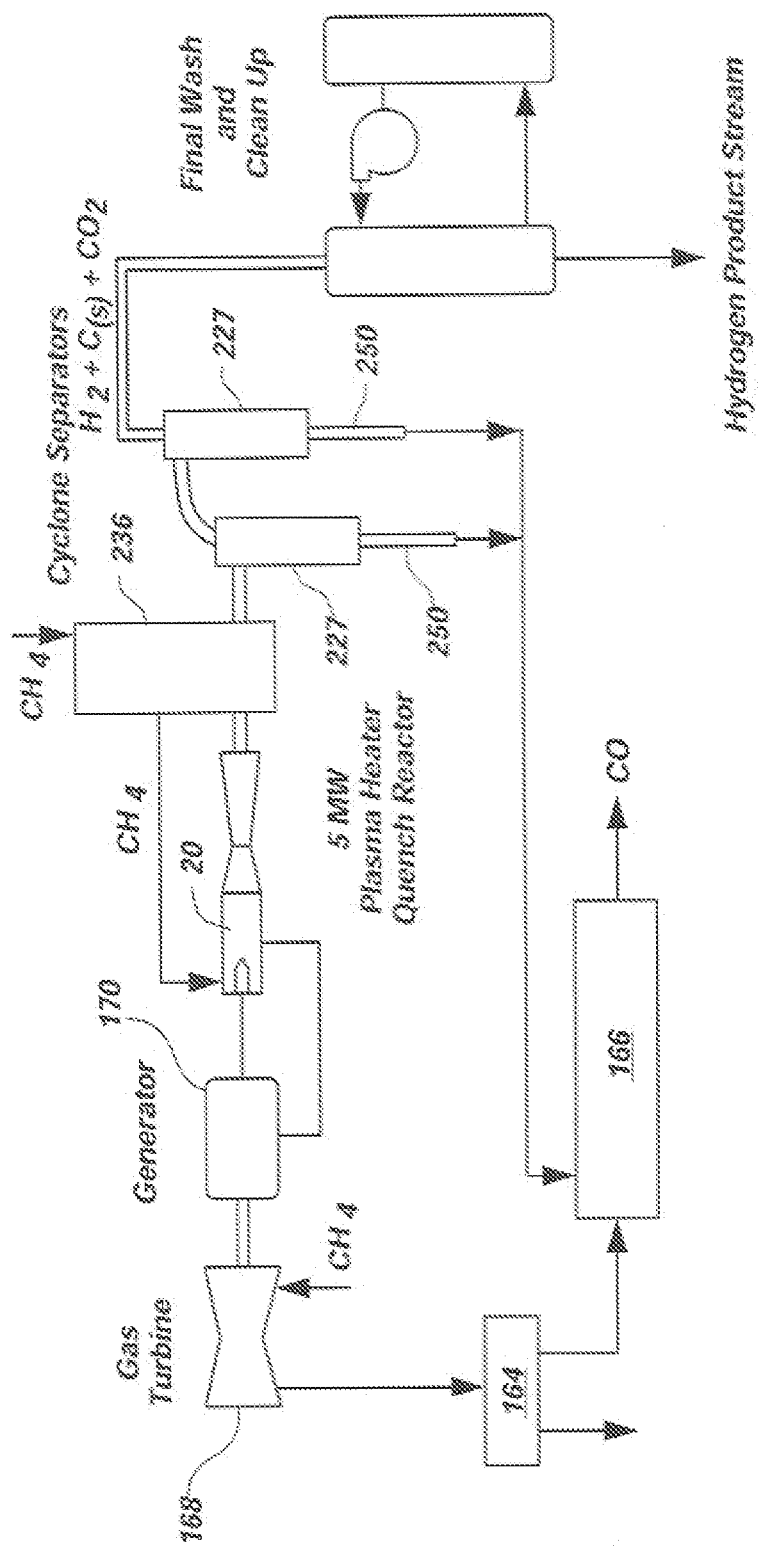
FIG. 12 is an overview of one embodiment of the invention wherein the elemental carbon is combined with a carbon dioxide source to form valuable carbon monoxide.

FIG. 12 illustrates one use of elemental carbon stream 150 as illustrated in FIG. 11. Where it is desirable to utilize the elemental carbon, whether as part of an on-board system or in a separate operation, the elemental carbon may be contacted with conventional combustion exhaust gases to react with the carbon dioxide to form carbon monoxide. Carbon monoxide is a valuable intermediate for many industries. The prior technology for production of carbon monoxide involved steam and/or catalytic reforming of natural gas to form the products of carbon monoxide and diatomic hydrogen.

The present invention utilizes the abundance of carbon dioxide, that is produced by the large number of operations around the globe, to generate the valuable intermediate of carbon monoxide. An inventive system is provided in FIG. 12 that takes advantage of combination of the inventive conversion of a light hydrocarbon into elemental carbon and diatomic hydrogen, with the conversion of the elemental carbon with carbon dioxide into the valuable carbon monoxide.

FIG. 12 illustrates a gas turbine 168 that burns a light hydrocarbon such as methane to turn a generator 170 for the generation of power sufficient to operate the inventive plasma quench to convert a light hydrocarbon such as methane. Combustion products exit gas turbine 168 as principally carbon dioxide and water according to the reaction: $2O_2 + CH_4 \longrightarrow CO_2 + 2H_2O$. Where preferable, a condenser 164 may be provided to remove water from the combustion gas effluent from gas turbine 168.

The inventive plasma quench operates from generator 170 that is used to strike a plasma in order to convert methane or other light hydrocarbons within reactor chamber 20 into elemental carbon and diatomic hydrogen. A waste heat exchanger 236 may be provided, either before or after at least one cyclone 227 for separating the elemental carbon from the diatomic hydrogen.

The elemental carbon that exits cyclone 227, as indicated at 250, may then be combined with the carbon dioxide effluent from gas turbine 168 in a carbon monoxide-producing reactor 166. Reactor 166 may be a fluidized bed reactor where the carbon dioxide is combined with the elemental carbon under reactive conditions according to the reaction: $C+CO_2 \longrightarrow 2CO$.

Other reactor schemes may be used for the combination of elemental carbon with carbon dioxide to form carbon monoxide. The carbon stream may be heated to a highly reactive solid species or it may be heated above about 4,200° C. to a gaseous species.

The carbon monoxide produced from reactor 166, or any other reactor scheme known in the art, is a valuable feed stock for several processes such as the alcohols industry and others.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

We claim:

1. A system for converting a hydrocarbon stream into diatomic hydrogen and elemental carbon, comprising:
    an axial reactor having an inlet adjacent a first end thereof, the inlet being configured to convey a hydrocarbon stream therethrough;
    a plasma torch having at least one pair of electrodes positioned at the first end of the axial reactor;
    an axial reactor chamber disposed within the axial reactor having an inlet end, a chamber length, and an outlet end;
    a coaxial converging nozzle disposed at the outlet end of the axial reactor chamber;
    a free expansion chamber coupled to the coaxial converging nozzle; and
    means for recovering at least one desired product from the free expansion chamber.

2. The system of claim 1, wherein the plasma torch is configured to produce a hydrogen plasma gas and heat the hydrocarbon stream to an equilibrium state that contains diatomic hydrogen from the hydrocarbon stream within the axial reactor chamber.

3. The system of claim 1, wherein the free expansion chamber includes a diverging nozzle having an expansion angle greater than 35°.

4. The system of claim 3, further comprising an injector disposed in the diverging nozzle.

5. The system of claim 4, wherein the expansion angle is approximately 90°.

6. The system of claim 1, wherein the coaxial converging nozzle and the free expansion chamber are cooperatively configured to promote turbulent flow of a gas flowing from the coaxial converging nozzle and through the free expansion chamber.

7. The system of claim 1, further an injector disposed in the free expansion chamber.

8. The system of claim 1, wherein the means for recovering the carbon product and the diatomic hydrogen product further comprises a cyclone.

9. The system of claim 1, further comprising means for liquefying the at least one desired product.

10. The system of claim 1, further comprising a waste heat exchanger that is flow positioned between the expansion chamber and the means for recovering the at least one desired product.

11. The system of claim 1, wherein the means for recovering at least one desired product further includes a means for separating unsaturated hydrocarbons from the end product stream.

12. The system of claim 1, further comprising a fuel cell located and configured to receive the at least one desired end product.

13. The system of claim 1, further comprising:
    a fuel cell that is supplied with the at least one desired product, the at least one desired product comprising diatomic hydrogen;
    a first waste heat exchanger that is flow positioned between the expansion chamber and the fuel cell; and
    a second waste heat exchanger that is flow positioned after the fuel cell.

14. The system of claim 1, further comprising an internal combustion engine that is fueled, at least in part, by the at least one desired product.

15. The system of claim 1, further comprising a source of carbon dioxide coupled with at least one other reactor, the at least one other reactor being located and configured to receive the at least one desired end product and facilitate reaction between carbon dioxide supplied from the source of carbon dioxide and the at least one desired end product.

16. The system of claim 15, wherein the at least one other reactor includes a fluidized bed reactor.

17. The system of claim 16, wherein the at least one desired product includes elemental carbon, and wherein the fluidized bed reactor is configured to react elemental carbon with carbon dioxide and produce carbon monoxide.

18. The system of claim 17, further comprising a generator mechanically coupled to the gas turbine, the generator being electrically coupled with the at least one pair of electrodes of the plasma torch.

19. The system of claim 15, wherein the source of carbon dioxide includes a gas turbine.

* * * * *